US011210316B1

(12) United States Patent
Eubank et al.

(10) Patent No.: US 11,210,316 B1
(45) Date of Patent: Dec. 28, 2021

(54) JOIN KEY RECOVERY AND FUNCTIONAL DEPENDENCY ANALYSIS TO GENERATE DATABASE QUERIES

(71) Applicant: Tableau Software, Inc., Seattle, WA (US)

(72) Inventors: Christian Gabriel Eubank, Seattle, WA (US); Justin Talbot, Seattle, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 0 days.

(21) Appl. No.: 16/579,762

(22) Filed: Sep. 23, 2019

Related U.S. Application Data

(60) Provisional application No. 62/748,968, filed on Oct. 22, 2018.

(51) Int. Cl.
*G06F 7/00* (2006.01)
*G06F 16/26* (2019.01)
(Continued)

(52) U.S. Cl.
CPC ............ *G06F 16/26* (2019.01); *G06F 16/212* (2019.01); *G06F 16/2246* (2019.01);
(Continued)

(58) Field of Classification Search
CPC ...... G06F 16/211; G06F 16/248; G06F 16/26; G06F 16/2246; G06F 16/24544; G06F 16/212
(Continued)

(56) References Cited

U.S. PATENT DOCUMENTS 5,511,186 A 4/1996 Carhart et al.
6,199,063 B1 3/2001 Colby et al.
(Continued)

OTHER PUBLICATIONS

Ganapavurapu, "Designing and Implementing a Data Warehouse Using Dimensional Modling," Thesis Dec. 7, 2014, XP055513055, retrieved from Internet: UEL:https://digitalepository.unm.edu/cgi/viewcontent.cgi?article= 1091&context-ece etds, 87 pgs.
(Continued)

*Primary Examiner* — Md I Uddin
(74) *Attorney, Agent, or Firm* — Morgan, Lewis & Bockius LLP

(57) ABSTRACT

A computer receives a visual specification, which specifies a data source, visual variables, and data fields from the data source. Each visual variable is associated with either data fields or filters. The computer obtains a data model encoding the data source as a tree of related logical tables. Each logical table includes logical fields that corresponds to either a data field or a calculation that spans logical tables. The computer constructs a query corresponding to the visual specification. The query references two logical tables connected via multiple linking fields. To generate the query, the computer generates a first left-outer join of the two tables, forms a hidden join key expression using a coalesce, according to the data model, and generates another left-outer join using the hidden join key expression. The computer executes the query and displays a data visualization according to the results of the query.

17 Claims, 26 Drawing Sheets

(51) Int. Cl.
*G06F 16/21* (2019.01)
*G06F 16/2453* (2019.01)
*G06F 16/2455* (2019.01)
*G06F 16/22* (2019.01)

(52) U.S. Cl.
CPC .... *G06F 16/2456* (2019.01); *G06F 16/24535* (2019.01); *G06F 16/24544* (2019.01)

(58) Field of Classification Search
USPC .......................... 707/714, 999.005, 999.102
See application file for complete search history.

(56) References Cited

U.S. PATENT DOCUMENTS 6,212,524 B1 4/2001 Weissman et al.
6,385,604 B1 5/2002 Bakalash et al.
6,492,989 B1 12/2002 Wilkinson
6,807,539 B2 10/2004 Miller et al.
7,023,453 B2 4/2006 Wilkinson
7,176,924 B2 2/2007 Wilkinson
7,290,007 B2 10/2007 Farber et al.
7,337,163 B1 2/2008 Srinivasan et al.
7,426,520 B2 9/2008 Gorelik et al.
7,800,613 B2 9/2010 Hanrahan et al.
8,082,243 B2 12/2011 Gorelik et al.
8,442,999 B2 5/2013 Gorelik et al.
8,874,613 B2 10/2014 Gorelik et al.
9,336,253 B2 5/2016 Gorelik et al.
9,563,674 B2 2/2017 Hou et al.
9,613,086 B1 4/2017 Sherman
9,710,527 B1 7/2017 Sherman
9,779,150 B1 10/2017 Sherman et al.
2001/0054034 A1 12/2001 Arning et al.
2003/0023608 A1 1/2003 Egilsson et al.
2004/0103088 A1 5/2004 Cragun et al.
2004/0122844 A1 6/2004 Malloy et al.
2004/0139061 A1 7/2004 Colossi et al.
2004/0243593 A1 12/2004 Stolte et al.
2005/0038767 A1 2/2005 Verschell et al.
2005/0060300 A1 3/2005 Stolte et al.
2005/0182703 A1 8/2005 D'hers et al.
2006/0010143 A1 1/2006 Netz et al.
2006/0167924 A1 7/2006 Bradlee et al.
2006/0173813 A1 8/2006 Zorola
2006/0206512 A1* 9/2006 Hanrahan ............. G06T 11/206
2006/0294081 A1 12/2006 Dettinger et al.
2007/0000613 A1 1/2007 Rubin
2007/0156734 A1 7/2007 Dipper et al.
2008/0016026 A1 1/2008 Farber et al.
2009/0000063 A1 1/2009 Li et al.
2009/0319548 A1 12/2009 Brown et al.
2010/0005054 A1 1/2010 Smith et al.
2010/0005114 A1 1/2010 Dipper
2010/0077340 A1 3/2010 French et al.
2011/0131250 A1 6/2011 Stolte et al.
2012/0116850 A1 5/2012 Abe et al.
2012/0117453 A1 5/2012 Mackinlay et al.
2013/0080584 A1 3/2013 Benson
2013/0166498 A1 6/2013 Aski et al.
2013/0191418 A1 7/2013 Martin, Jr. et al.
2014/0189553 A1 7/2014 Bleizeffer et al.
2015/0039912 A1* 2/2015 Payton .................... H04L 9/008
713/193
2015/0278371 A1 10/2015 Anand et al.
2017/0132277 A1 5/2017 Hsiao et al.
2017/0357693 A1 12/2017 Kumar et al.
2018/0336223 A1 11/2018 Kapoor et al.
2020/0073876 A1 3/2020 Lopez et al.
2020/0125559 A1 4/2020 Talbot et al.

OTHER PUBLICATIONS

Gyldenege, Preinterview First Office Action, U.S. Appl. No. 16/221,413, dated Jun. 11, 2020, 4 pgs.
Gyldenege, First Action Interview Office Action, U.S. Appl. No. 16/221,413, dated Jul. 27, 2020, 7 pgs.
Mansmann, "Extending the OLAP Technology to Handle Non-Conventional and Complex Data," Sep. 29, 2008, XP055513939, retrieve from URL/https://kops.uni-konstanz.de/hadle/123456789/5891, 1 pg.
Mondrian 3.0.4 Technical Guide, 2009 (YearL 2009).
Morton, Office Action, U.S. Appl. No. 14/054,803, dated Sep. 11, 2015, 22 pgs.
Morton, Final Office Action, U.S. Appl. No. 14/054,803, dated May 11, 2016, 22 pgs.
Morton, Notice of Allowance, U.S. Appl. No. 14/054,803, dated Mar. 1, 2017, 23 pgs.
Morton, Preinterview 1st Office Action, U.S. Appl. No. 15/497,130, dated Sep. 18, 2019, 6 pgs.
Morton, First Action Interview Office Action, U.S. Appl. No. 15/497,130, dated Feb. 19, 2020, 26 pgs.
Song et al., "SAMSTAR," Data Warehousing and OLAP, ACM, 2 Penn Plaza, Suite 701, New York, NY, Nov. 9, 2007, XP058133701, pp. 9 to 16, 8 pgs.
Tableau Software, Inc., International Search Report and Written Opinion, PCTUS2019056491, dated Jan. 2, 2020, 11 pgs.
Tableau Software, Inc., International Search Report and Written Opinion, PCTUS2018/044878, dated Oct. 22, 2018, 15 pgs.
Tableau Software, Inc., International Preliminary Report on Patentability, PCTUS2018/044878, dated Apr. 14, 2020, 12 pgs.
Talbot, Office Action, U.S. Appl. No. 14/801,750. dated May 7, 2018, 60 pgs.
Talbot, Final Office Action, U.S. Appl. No. 14/801,750. dated Nov. 28, 2018, 63 pgs.
Talbot, Office Action, U.S. Appl. No. 14/801,750. dated Jun. 24, 2019, 55 pgs.
Talbot, Preinterview First Office Action, U.S. Appl. No. 15/911,026, dated Jun. 9, 2020, 6 pgs.
Talbot, First Action Interview Office Action, U.S. Appl. No. 15/911,026, dated Jul. 22, 2020, 6 pgs.
Talbot, Final Office Action, U.S. Appl. No. 15/911,026, dated Dec. 16, 2020, 28 pgs.
Talbot, Preinterview First Office Action, U.S. Appl. No. 16/236,611, dated Oct. 28, 2020, 6 pgs.
Talbot, First Action Interview Office Action, U.S. Appl. No. 16/236,611, dated Dec. 22, 2020, 5 pgs.
Talbot, Preinterview First Office Action, U.S. Appl. No. 16/236,612, dated Oct. 29, 2020, 6 pgs.
Eubank, Non-Final Office Action, U.S. Appl. No. 16/570,969, dated Jun. 15, 2021, 12 pgs.
Talbot, Final Office Action, U.S. Appl. No. 16/236,611, dated Apr. 27, 2021, 21 pgs.
Talbot, Final Office Action, U.S. Appl. No. 16/236,612, dated Apr. 28, 2021, 20 pgs.

* cited by examiner

802 Budget Table (Example)

806 808 810

| Category | Date | Budget |
|---|---|---|
| Tiny Sandwiches | 1/1/2019 | 40 |
| Little Deserts | 1/1/2019 | 30 |
| Scones | 1/1/2019 | 20 |
| Tea | 1/1/2019 | 50 |
| Tiny Sandwiches | 2/1/2019 | 40 |
| Little Deserts | 2/1/2019 | 30 |
| Scones | 2/1/2019 | 20 |
| Tea | 2/1/2019 | 50 |
| Doilies | 2/1/2019 | 30 |
| Tiny Sandwiches | 3/1/2019 | 40 |
| Little Deserts | 3/1/2019 | 30 |
| Scones | 3/1/2019 | 20 |
| Tea | 3/1/2019 | 50 |
| Tiny Sandwiches | 4/1/2019 | 40 |
| Little Deserts | 4/1/2019 | 30 |
| Scones | 4/1/2019 | 20 |
| Tea | 4/1/2019 | 50 |
| Tiny Sandwiches | 5/1/2019 | 40 |
| Little Deserts | 5/1/2019 | 30 |
| Scones | 5/1/2019 | 20 |
| Tea | 5/1/2019 | 50 |
| Tiny Sandwiches | 6/1/2019 | 40 |
| Little Deserts | 6/1/2019 | 30 |
| Scones | 6/1/2019 | 20 |
| Tea | 6/1/2019 | 50 |
| Tiny Sandwiches | 7/1/2019 | 40 |
| Little Deserts | 7/1/2019 | 30 |
| Scones | 7/1/2019 | 20 |
| Tea | 7/1/2019 | 50 |
| Tiny Sandwiches | 8/1/2019 | 40 |
| Little Deserts | 8/1/2019 | 30 |
| Scones | 8/1/2019 | 20 |
| Tea | 8/1/2019 | 50 |
| Doilies | 8/1/2019 | 30 |
| Tiny Sandwiches | 9/1/2019 | 40 |
| Little Deserts | 9/1/2019 | 30 |
| Scones | 9/1/2019 | 20 |
| Tea | 9/1/2019 | 50 |
| Tiny Sandwiches | 10/1/2019 | 40 |
| Little Deserts | 10/1/2019 | 30 |
| Scones | 10/1/2019 | 20 |
| Tea | 10/1/2019 | 50 |
| Tiny Sandwiches | 11/1/2019 | 40 |
| Little Deserts | 11/1/2019 | 30 |
| Scones | 11/1/2019 | 20 |
| Tea | 11/1/2019 | 50 |
| Tiny Sandwiches | 12/1/2019 | 40 |
| Little Deserts | 12/1/2019 | 30 |
| Scones | 12/1/2019 | 20 |
| Tea | 12/1/2019 | 50 |

Figure 8A

804 Expenses Table (Example continued)

812 814 816 818

| Category | Item | Cost | Date |
|---|---|---|---|
| Tiny Sandwiches | Cucumber Sandwich | 10 | 1/1/2019 |
| Tiny Sandwiches | Salmon Sandwich | 20 | 1/1/2019 |
| Tiny Sandwiches | Egg Salad Sandwich | 10 | 1/1/2019 |
| Little Deserts | Madeline | 7 | 1/1/2019 |
| Little Deserts | Sponge Cake | 4 | 1/1/2019 |
| Little Deserts | Crepes | 5 | 1/1/2019 |
| Little Deserts | Macaroon | 9 | 1/1/2019 |
| Scones | Scone | 10 | 1/1/2019 |
| Scones | Jam | 4 | 1/1/2019 |
| Scones | Clotted Cream | 6 | 1/1/2019 |
| Tea | Green Tea | 12 | 1/1/2019 |
| | | | |
| Tea | Earl Grey | 18 | 1/1/2019 |
| Tiny Sandwiches | Cucumber Sandwich | 10 | 2/1/2019 |
| Tiny Sandwiches | Salmon Sandwich | 20 | 2/1/2019 |
| Tiny Sandwiches | Egg Salad Sandwich | 10 | 2/1/2019 |
| Little Deserts | Madeline | 7 | 2/1/2019 |
| Little Deserts | Sponge Cake | 4 | 2/1/2019 |
| Little Deserts | Trifle | 5 | 2/1/2019 |
| Little Deserts | Macaroon | 9 | 2/1/2019 |
| Scones | Scone | 10 | 2/1/2019 |
| | | | |
| Scones | Clotted Cream | 6 | 2/1/2019 |
| Tea | Green Tea | 12 | 2/1/2019 |
| Tea | English Breakfast Tea | 14 | 2/1/2019 |
| Tea | Earl Grey | 18 | 2/1/2019 |
| Utensils | Trifle Spoon | 9 | 2/1/2019 |
| Tiny Sandwiches | Cucumber Sandwich | 10 | 3/1/2019 |
| | | | |
| Tiny Sandwiches | Egg Salad Sandwich | 10 | 3/1/2019 |
| Little Deserts | Madeline | 7 | 3/1/2019 |
| Little Deserts | Sponge Cake | 4 | 3/1/2019 |
| Little Deserts | Trifle | 5 | 3/1/2019 |
| Little Deserts | Macaroon | 9 | 3/1/2019 |
| Scones | Scone | 10 | 3/1/2019 |
| Scones | Jam | 4 | 3/1/2019 |
| Scones | Clotted Cream | 6 | 3/1/2019 |
| Tea | Green Tea | 12 | 3/1/2019 |
| Tea | English Breakfast Tea | 14 | 3/1/2019 |
| Tea | Earl Grey | 18 | 3/1/2019 |
| Tiny Sandwiches | Cucumber Sandwich | 10 | 4/1/2019 |
| Tiny Sandwiches | Salmon Sandwich | 20 | 4/1/2019 |
| Tiny Sandwiches | Egg Salad Sandwich | 10 | 4/1/2019 |
| Little Deserts | Madeline | 7 | 4/1/2019 |
| Little Deserts | Sponge Cake | 4 | 4/1/2019 |

Figure 8B

804 Expenses Table (Example continued)

812 814 816 818

| | | | |
|---|---|---|---|
| Little Deserts | Trifle | 5 | 4/1/2019 |
| Little Deserts | Macaroon | 3 | 4/1/2019 |
| Scones | Scone | 10 | 4/1/2019 |
| Scones | Jam | 4 | 4/1/2019 |
| Scones | Clotted Cream | 6 | 4/1/2019 |
| Tea | Green Tea | 12 | 4/1/2019 |
| Tea | English Breakfast Tea | 14 | 4/1/2019 |
| Tea | Earl Grey | 18 | 4/1/2019 |
| Utensils | Trifle Spoon | 9 | 4/1/2019 |
| Tiny Sandwiches | Cucumber Sandwich | 10 | 5/1/2019 |
| Tiny Sandwiches | Watercress Sandwich | 25 | 5/1/2019 |
| Tiny Sandwiches | Egg Salad Sandwich | 10 | 5/1/2019 |
| Little Deserts | Madeline | 7 | 5/1/2019 |
| Little Deserts | Sponge Cake | 4 | 5/1/2019 |
| Little Deserts | Trifle | 5 | 5/1/2019 |
| Little Deserts | Macaroon | 3 | 5/1/2019 |
| Scones | Scone | 10 | 5/1/2019 |
| Scones | Jam | 4 | 5/1/2019 |
| | | | |
| Tea | Green Tea | 12 | 5/1/2019 |
| Tea | English Breakfast Tea | 14 | 5/1/2019 |
| Tea | Earl Grey | 18 | 5/1/2019 |
| Tea | Oolong | 13 | 5/1/2019 |
| Tiny Sandwiches | Salmon Sandwich | 20 | 6/1/2019 |
| Tiny Sandwiches | Egg Salad Sandwich | 10 | 6/1/2019 |
| | | | |
| Little Deserts | Sponge Cake | 4 | 6/1/2019 |
| Little Deserts | Trifle | 5 | 6/1/2019 |
| Little Deserts | Macaroon | 3 | 6/1/2019 |
| Scones | Scone | 10 | 6/1/2019 |
| Scones | Jam | 4 | 6/1/2019 |
| Scones | Clotted Cream | 6 | 6/1/2019 |
| Tea | Green Tea | 12 | 6/1/2019 |
| Tea | English Breakfast Tea | 14 | 6/1/2019 |
| Tea | Earl Grey | 18 | 6/1/2019 |
| Utensils | Sandwich Fork | 11 | 6/1/2019 |
| Utensils | Trifle Spoon | 9 | 6/1/2019 |
| Tiny Sandwiches | Cucumber Sandwich | 10 | 7/1/2019 |
| Tiny Sandwiches | Salmon Sandwich | 20 | 7/1/2019 |
| Tiny Sandwiches | Egg Salad Sandwich | 10 | 7/1/2019 |
| Little Deserts | Madeline | 7 | 7/1/2019 |
| Little Deserts | Sponge Cake | 4 | 7/1/2019 |
| Little Deserts | Trifle | 5 | 7/1/2019 |
| Little Deserts | Macaroon | 3 | 7/1/2019 |
| Scones | Scone | 10 | 7/1/2019 |
| Scones | Jam | 4 | 7/1/2019 |
| Scones | Clotted Cream | 6 | 7/1/2019 |

Figure 8C

804 Expenses Table (Example continued)

812 814 816 818

| | | | |
|---|---|---|---|
| Tea | Green Tea | 12 | 7/1/2019 |
| Tea | English Breakfast Tea | 14 | 7/1/2019 |
| Tea | Earl Grey | 18 | 7/1/2019 |
| Utensils | Sandwich Fork | 11 | 7/1/2019 |
| Tiny Sandwiches | Chicken Salad Sandwich | 15 | 8/1/2019 |
| Tiny Sandwiches | Salmon Sandwich | 20 | 8/1/2019 |
| Tiny Sandwiches | Egg Salad Sandwich | 10 | 8/1/2019 |
| Little Deserts | Madeline | 7 | 8/1/2019 |
| Little Deserts | Sponge Cake | 4 | 8/1/2019 |
| Little Deserts | Trifle | 5 | 8/1/2019 |
| Little Deserts | Macaroon | 9 | 8/1/2019 |
| Scones | Scone | 10 | 8/1/2019 |
| Scones | Jam | 4 | 8/1/2019 |
| Scones | Clotted Cream | 6 | 8/1/2019 |
| Tea | Green Tea | 12 | 8/1/2019 |
| Tea | English Breakfast Tea | 14 | 8/1/2019 |
| Tea | Earl Grey | 18 | 8/1/2019 |
| Utensils | Sandwich Fork | 11 | 8/1/2019 |
| Utensils | Trifle Spoon | 9 | 8/1/2019 |
| Tiny Sandwiches | Cucumber Sandwich | 10 | 9/1/2019 |
| Tiny Sandwiches | Salmon Sandwich | 20 | 9/1/2019 |
| Tiny Sandwiches | Egg Salad Sandwich | 10 | 9/1/2019 |
| Little Deserts | Madeline | 7 | 9/1/2019 |
| Little Deserts | Sponge Cake | 4 | 9/1/2019 |
| Little Deserts | Mouse | 11 | 9/1/2019 |
| Little Deserts | Macaroon | 9 | 9/1/2019 |
| Scones | Scone | 10 | 9/1/2019 |
| Scones | Jam | 4 | 9/1/2019 |
| Scones | Clotted Cream | 6 | 9/1/2019 |
| Tea | Green Tea | 12 | 9/1/2019 |
| Tea | English Breakfast Tea | 14 | 9/1/2019 |
| Tea | Earl Grey | 18 | 9/1/2019 |
| Tiny Sandwiches | Cucumber Sandwich | 10 | ###### |
| Tiny Sandwiches | Salmon Sandwich | 20 | ###### |
| Tiny Sandwiches | Egg Salad Sandwich | 10 | ###### |
| Little Deserts | Madeline | 7 | ###### |
| Little Deserts | Sponge Cake | 4 | ###### |
| Little Deserts | Trifle | 5 | ###### |
| Little Deserts | Macaroon | 9 | ###### |
| Scones | Scone | 10 | ###### |
| Scones | Jam | 4 | ###### |
| Scones | Clotted Cream | 6 | ###### |
| Tea | Green Tea | 12 | ###### |
| Tea | English Breakfast Tea | 14 | ###### |
| Tea | Earl Grey | 18 | ###### |
| Tiny Sandwiches | Cucumber Sandwich | 10 | 11/1/2019 |
| Tiny Sandwiches | Egg Salad Sandwich | 10 | 11/1/2019 |

Figure 8D

804 Expenses Table
(Example continued)

812 814 816 818

| | | | |
|---|---|---|---|
| Little Deserts | Madeline | 7 | 11/1/2019 |
| Little Deserts | Sponge Cake | 4 | 11/1/2019 |
| Little Deserts | Trifle | 5 | 11/1/2019 |
| Little Deserts | Macaroon | 9 | 11/1/2019 |
| Scones | Jam | 4 | 11/1/2019 |
| Scones | Clotted Cream | 6 | 11/1/2019 |
| Tea | Green Tea | 12 | 11/1/2019 |
| Tea | Earl Grey | 18 | 11/1/2019 |
| Tiny Sandwiches | Cucumber Sandwich | 10 | ###### |
| Tiny Sandwiches | Salmon Sandwich | 20 | ###### |
| Tiny Sandwiches | Egg Salad Sandwich | 10 | ###### |
| Little Deserts | Madeline | 7 | ###### |
| Little Deserts | Sponge Cake | 4 | ###### |
| Little Deserts | Trifle | 5 | ###### |
| Little Deserts | Macaroon | 9 | ###### |
| Scones | Scone | 10 | ###### |
| Scones | Jam | 4 | ###### |
| Scones | Clotted Cream | 6 | ###### |
| Tea | Green Tea | 12 | ###### |
| Tea | English Breakfast Tea | 14 | ###### |
| Utensils | Napkin Ring | 15 | ###### |

Figure 8E

Data Visualization 920

922

Using Budget Date

| Month of Date | Budget | Cost |
|---|---|---|
| Null | | 84.00 |
| January | 140.00 | 115.00 |
| February | 170.00 | 125.00 |
| March | 140.00 | 109.00 |
| April | 140.00 | 129.00 |
| May | 140.00 | 141.00 |
| June | 140.00 | 112.00 |
| July | 140.00 | 129.00 |
| August | 170.00 | 134.00 |
| September | 140.00 | 135.00 |
| October | 140.00 | 129.00 |
| November | 140.00 | 85.00 |
| December | 140.00 | 111.00 |

Figure 9B

Data Visualization 930

932

Using Expense Date

| Month of Date (Expenses) | Budget | Cost |
|---|---|---|
| Null | 60.00 | |
| January | 140.00 | 115.00 |
| February | 140.00 | 134.00 |
| March | 140.00 | 109.00 |
| April | 140.00 | 138.00 |
| May | 140.00 | 141.00 |
| June | 140.00 | 132.00 |
| July | 140.00 | 140.00 |
| August | 140.00 | 154.00 |
| September | 140.00 | 135.00 |
| October | 140.00 | 129.00 |
| November | 140.00 | 85.00 |
| December | 140.00 | 126.00 |

Figure 9C

Sales Table (Example) 940

942 944 946 948

| Amount | Sales Category | Origin Date |
| --- | --- | --- |
| 10 | Cars | 10-Jan |
| 20 | Boats | 10-Jan |
| 20 | Cars | 10-Feb |

Figure 9D

Returns Table (Example) 950

952 954 956

| Return Category | Origin Date |
| --- | --- |
| Cars | 10-Feb |
| Cars | |
| Trains | 5-Apr |

Figure 9E

Incorrect Results (Example) 960

962 964

| SUM(AMOUNT) | Return Category |
| --- | --- |
| 20 | Cars |
| 30 | NULL |

Figure 9F

Expected Results (Example) 970

972 974

| SUM(AMOUNT) | Return Category |
| --- | --- |
| 30 | Cars |
| 20 | NULL |

Figure 9G

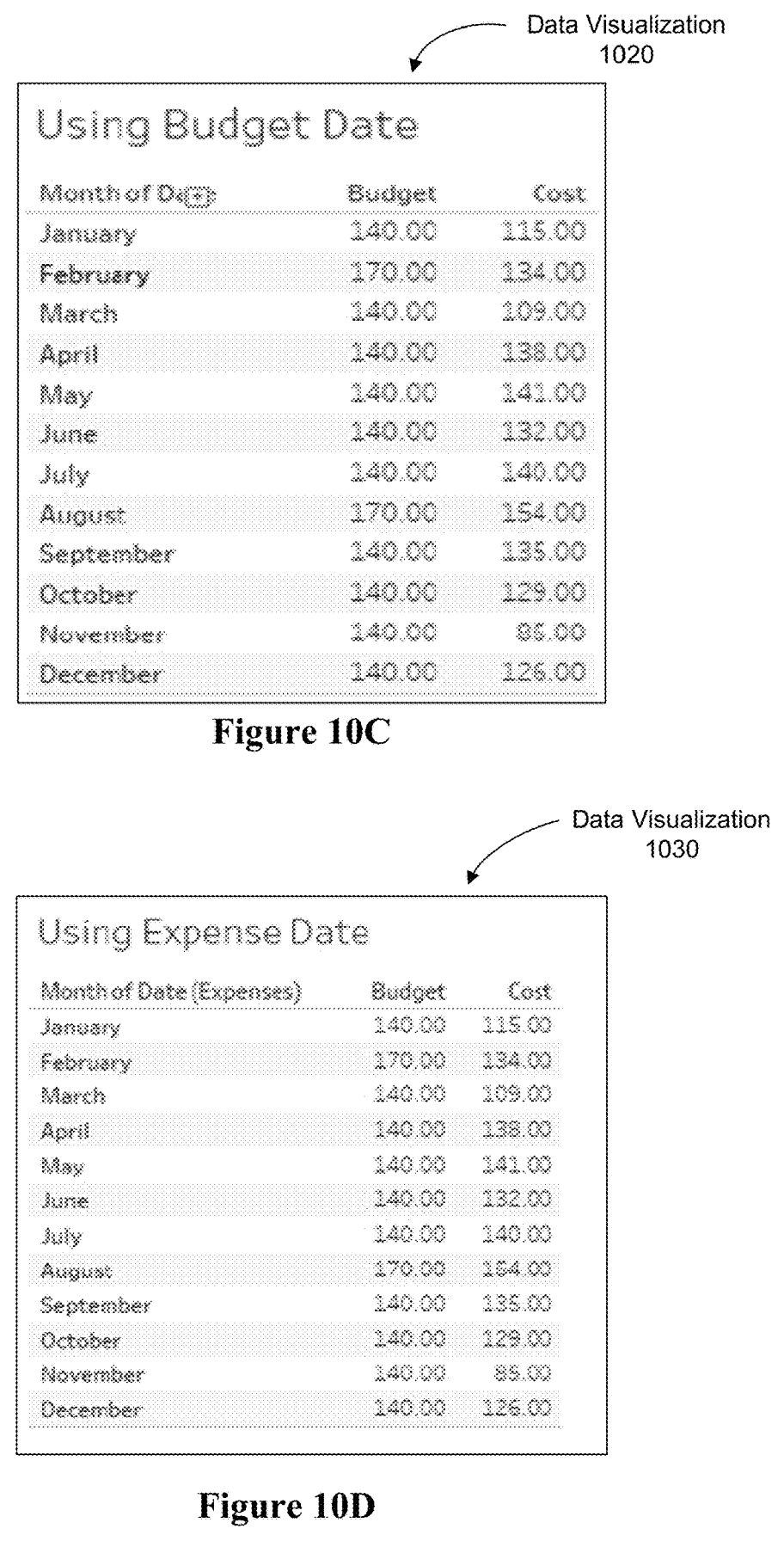

Data Visualization 1020

Using Budget Date

| Month of Da | Budget | Cost |
|---|---|---|
| January | 140.00 | 115.00 |
| February | 170.00 | 134.00 |
| March | 140.00 | 109.00 |
| April | 140.00 | 138.00 |
| May | 140.00 | 141.00 |
| June | 140.00 | 132.00 |
| July | 140.00 | 140.00 |
| August | 170.00 | 154.00 |
| September | 140.00 | 135.00 |
| October | 140.00 | 129.00 |
| November | 140.00 | 85.00 |
| December | 140.00 | 126.00 |

Figure 10C

Data Visualization 1030

Using Expense Date

| Month of Date (Expenses) | Budget | Cost |
|---|---|---|
| January | 140.00 | 115.00 |
| February | 170.00 | 134.00 |
| March | 140.00 | 109.00 |
| April | 140.00 | 138.00 |
| May | 140.00 | 141.00 |
| June | 140.00 | 132.00 |
| July | 140.00 | 140.00 |
| August | 170.00 | 154.00 |
| September | 140.00 | 135.00 |
| October | 140.00 | 129.00 |
| November | 140.00 | 85.00 |
| December | 140.00 | 126.00 |

Figure 10D

JOIN KEY RECOVERY AND FUNCTIONAL DEPENDENCY ANALYSIS TO GENERATE DATABASE QUERIES

RELATED APPLICATIONS

This application claims priority to U.S. Provisional Patent Application No. 62/748,968, filed Oct. 22, 2018, entitled "Using an Object Model of Heterogeneous Data to Facilitate Building Data Visualizations," which is incorporated by reference herein in its entirety.

This application is related to U.S. patent application Ser. No. 16/236,611, filed Dec. 30, 2018, entitled "Generating Data Visualizations According to an Object Model of Selected Data Sources," which is incorporated by reference herein in its entirety.

This application is related to U.S. patent application Ser. No. 16/236,612, filed Dec. 30, 2018, entitled "Generating Data Visualizations According to an Object Model of Selected Data Sources," which is incorporated by reference herein in its entirety.

This application is related to U.S. patent application Ser. No. 15/911,026, filed Mar. 2, 2018, entitled "Using an Object Model of Heterogeneous Data to Facilitate Building Data Visualizations," which claims priority to U.S. Provisional Patent Application 62/569,976, filed Oct. 9, 2017, "Using an Object Model of Heterogeneous Data to Facilitate Building Data Visualizations," each of which is incorporated by reference herein in its entirety.

This application is also related to U.S. patent application Ser. No. 14/801,750, filed Jul. 16, 2015, entitled "Systems and Methods for using Multiple Aggregation Levels in a Single Data Visualization," and U.S. patent application Ser. No. 15/497,130, filed Apr. 25, 2017, entitled "Blending and Visualizing Data from Multiple Data Sources," which is a continuation of U.S. patent application Ser. No. 14/054,803, filed Oct. 15, 2013, entitled "Blending and Visualizing Data from Multiple Data Sources," now U.S. Pat. No. 9,633,076, which claims priority to U.S. Provisional Patent Application No. 61/714,181, filed Oct. 15, 2012, entitled "Blending and Visualizing Data from Multiple Data Sources," each of which is incorporated by reference herein in its entirety.

This application is also related to U.S. patent application Ser. No. 16/570,969, filed Sep. 13, 2019, entitled "Utilizing Appropriate Measure Aggregation for Generating Data Visualizations of Multi-fact Datasets," which is incorporated by reference herein in its entirety.

TECHNICAL FIELD

The disclosed implementations relate generally to data visualization and more specifically to interactive visual analysis of a data set using an object model of the data set.

BACKGROUND

Data visualization applications enable a user to understand a data set visually, including distribution, trends, outliers, and other factors that are important to making business decisions. Some data elements must be computed based on data from the selected data set. For example, data visualizations frequently use sums to aggregate data. Some data visualization applications enable a user to specify a "Level of Detail" (LOD), which can be used for the aggregate calculations. However, specifying a single Level of Detail for a data visualization is insufficient to build certain calculations.

Some data visualization applications provide a user interface that enables users to build visualizations from a data source by selecting data fields and placing them into specific user interface regions to indirectly define a data visualization. See, for example, U.S. patent application Ser. No. 10/453,834, filed Jun. 2, 2003, entitled "Computer Systems and Methods for the Query and Visualization of Multidimensional Databases," now U.S. Pat. No. 7,089,266, which is incorporated by reference herein in its entirety. However, when there are complex data sources and/or multiple data sources, it may be unclear what type of data visualization to generate (if any) based on a user's selections.

In addition, some systems construct queries that yield data visualizations that are not what a user expects. In some cases, some rows of data are omitted (e.g., when there is no corresponding data in one of the fact tables). These problems can be particularly problematic because an end user may not be aware of the problem and/or not know what is causing the problem.

SUMMARY

Generating a data visualization that combines data from multiple tables can be challenging, especially when there are multiple fact tables. In some cases, it can help to construct an object model of the data before generating data visualizations. In some instances, one person is a particular expert on the data, and that person creates the object model. By storing the relationships in an object model, a data visualization application can leverage that information to assist all users who access the data, even if they are not experts.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in the data visualization user interface. Many-to-many relationships are conceptually split into two many-to-one relationships by adding an associative table capturing the relationship.

Once a class model is constructed, a data visualization application can assist a user in various ways. In some implementations, based on data fields already selected and placed onto shelves in the user interface, the data visualization application can recommend additional fields or limit what actions can be taken to prevent unusable combinations. In some implementations, the data visualization application allows a user considerable freedom in selecting fields, and uses the object model to build one or more data visualizations according to what the user has selected.

In accordance with some implementations, a method generates data visualizations. The method is performed at a computer having one or more processors and memory. The memory stores one or more programs configured for execution by the one or more processors. The computer receives a visual specification, which specifies a data source, a plurality of visual variables, and a plurality of data fields from the data source. Each of the visual variables is associated with either (i) a respective one or more of the data fields or (ii) one or more filters. The computer also obtains an data model (or an object model) encoding the data source as a tree of logical tables. Each logical table has its own physical representation and includes a respective one or more logical fields. Each logical field corresponds to either a data field or a calculation that spans one or more logical tables. The data model includes a first logical table connected to a second logical table via multiple linking data fields. The computer constructs a query corresponding to the visual specification. The query references the first logical table and the second logical table. The computer constructs the query by performing a sequence of operations. The sequence of operations includes generating a first left-outer join of the first logical table with the second logical table. The sequence of operations also includes forming a hidden join key expression comprising coalescing (i) a linking data field from the first logical table and (ii) a corresponding linking data field in the second logical table, according to the data model. The sequence of operations also includes generating a second left-outer join using the hidden join key expression. The computer subsequently executes the query against the data source to retrieve tuples that comprise distinct ordered combinations of data values for the data fields, builds and displays a data visualization according to the data fields in the tuples and according to the visual variables to which each of the data fields is associated.

In some implementations, the computer generates the second left-outer join using the hidden join key expression to join the second logical table with a third logical table that is connected to the second logical table via one or more linking data fields.

In some implementations, the method further includes forming a plurality of hidden join key expressions. Each hidden join key expression includes coalescing (i) a respective linking data field from the first logical table and (ii) a corresponding respective linking data field from the second logical table, according to the data model. In some implementations, generating the second left-outer join includes generating a plurality of subqueries. Each subquery corresponds to a respective linking data field of the second logical table and a respective hidden join key expression. Each subquery groups the second logical table by the respective linking data field. The method left joins the result of the first left-outer join with the result of each subquery using its corresponding respective hidden join key expression to obtain the second left-outer join.

In some implementations, the method further includes, for each subquery of the plurality of subqueries, aliasing a respective linking data field of the first logical table to a respective linking data field of the second logical table corresponding to the respective subquery.

In some implementations, the method further includes: (i) layering, over the query, calculations and filters that functionally depend on an aliased linking data field of the first logical table, to obtain an updated query; and (ii) executing the updated query against the data source to retrieve the tuples that comprise distinct ordered combinations of data values for the data fields.

In some implementations, prior to executing the query against the data source, the computer optimizes the query by eliminating the second left-outer join and transforming the first left-outer join to join on only keys required to compute each dimension field.

In some implementations, prior to executing the query against the data source, the computer optimizes the query by eliminating the first left-outer join of the first logical table with the second logical table.

In some implementations, prior to executing the query against the data source, the computer optimizes the query by reordering the first left-outer join and the second left-outer join.

In accordance with some implementations, a system for generating data visualizations includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors. The one or more programs include instructions for performing any of the methods described herein.

Thus methods, systems, and graphical user interfaces are provided for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIGS. 8A-8E illustrate example tables that are part of an object model, according to some implementations.

FIGS. 9B and 9C show example data visualizations, according to some implementations.

FIGS. 9D and 9E illustrate example tables that are part of an object model, according to some implementations.

FIG. 9F illustrates incorrect results for a query that joins the tables in FIGS. 9D and 9E, according to some implementations.

FIG. 9G illustrates expected results for a query that joins the tables in FIGS. 9D and 9E, according to some implementations.

FIG. 10C shows an example data visualization obtained based on a query constructed using the process in FIG. 10A, according to some implementations.

FIG. 10D shows another example data visualization obtained based on a query constructed using the process in FIG. 10A, according to some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
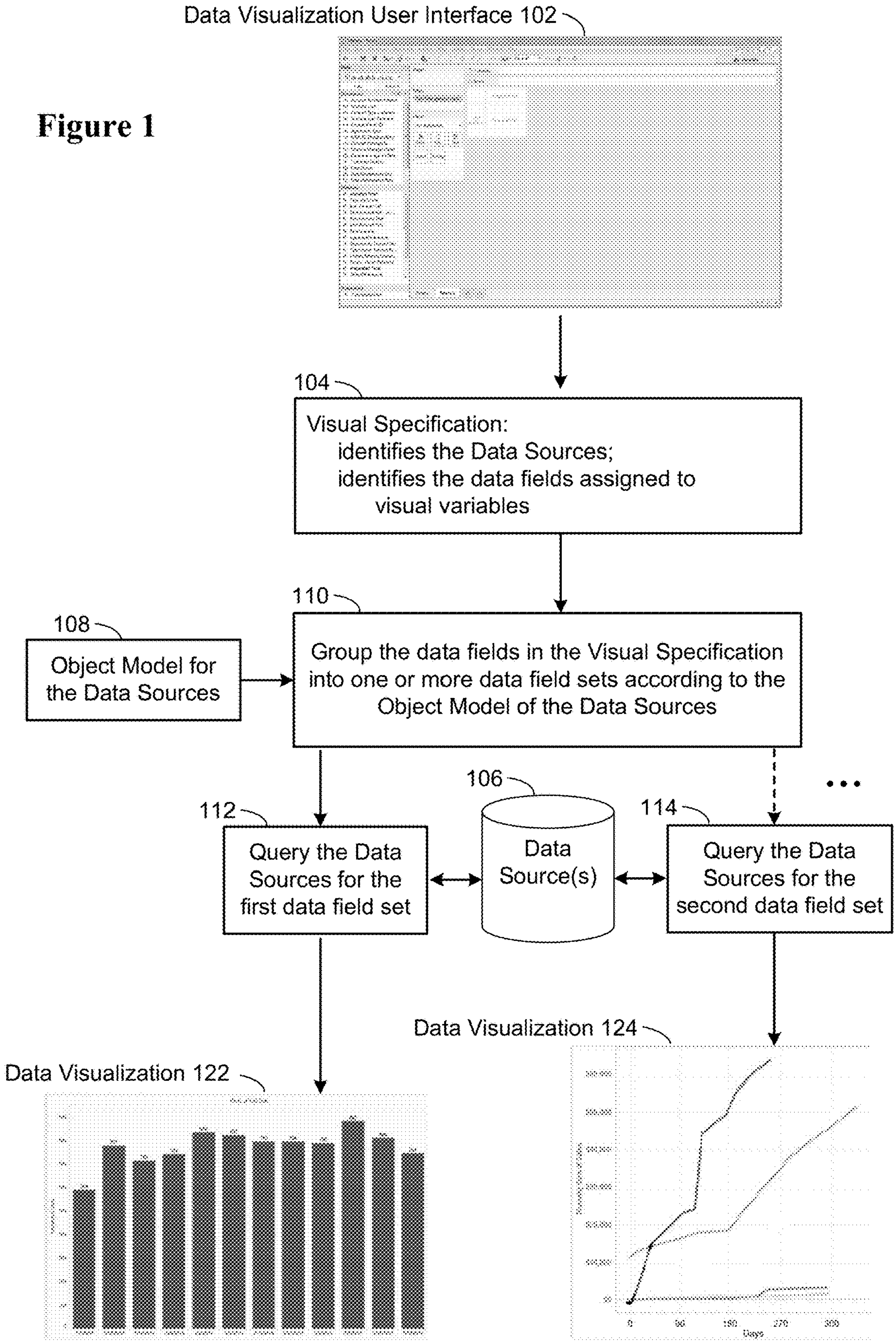
FIG. 1 illustrates conceptually a process of building a data visualization in accordance with some implementations.

Some implementations of an interactive data visualization application use a data visualization user interface 102 to build a visual specification 104, as shown in FIG. 1. The visual specification identifies one or more data source 106, which may be stored locally (e.g., on the same device that is displaying the user interface 102) or may be stored externally (e.g., on a database server or in the cloud). The visual specification 104 also includes visual variables. The visual variables specify characteristics of the desired data visualization indirectly according to selected data fields from the data sources 106. In particular, a user assigns zero or more data fields to each of the visual variables, and the values of the data fields determine the data visualization that will be displayed.

In most instances, not all of the visual variables are used. In some instances, some of the visual variables have two or more assigned data fields. In this scenario, the order of the assigned data fields for the visual variable (e.g., the order in which the data fields were assigned to the visual variable by the user) typically affects how the data visualization is generated and displayed.

Some implementations use an object model 108 to build the appropriate data visualizations. In some instances, an object model applies to one data source (e.g., one SQL database or one spreadsheet file), but an object model may encompass two or more data sources. Typically, unrelated data sources have distinct object models. In some instances, the object model closely mimics the data model of the physical data sources (e.g., classes in the object model corresponding to tables in a SQL database). However, in some cases the object model is more normalized (or less normalized) than the physical data sources. An object model groups together attributes (e.g., data fields) that have a one-to-one relationship with each other to form classes, and identifies many-to-one relationships among the classes. In some cases, the many-to-one relationships are illustrated with arrows, with the "many" side of each relationship pointing to the "one" side of the relationship. The object model also identifies each of the data fields (attributes) as either a dimension or a measure. In the following, the letter "D" (or "d") is used to represent a dimension, whereas the latter "M" (or "m") is used to represent a measure. Dimensions are categorical data fields that store discrete values (e.g., data fields with string data types). Measures are typically numeric data fields, which can be aggregated (e.g., but summing or computing an average). When an object model 108 is constructed, it can facilitate building data visualizations based on the data fields a user selects. Because a single object model can be used by an unlimited number of other people, building the object model for a data source is commonly delegated to a person who is a relative expert on the data source, As a user adds data fields to the visual specification (e.g., indirectly by using the graphical user interface to place data fields onto shelves), the data visualization application 222 (or web application 322) groups (110) together the user-selected data fields according to the object model 108. Such groups are called data field sets 294. In many cases, all of the user-selected data fields are in a single data field set 294. In some instances, there are two or more data field sets 294. Each measure m is in exactly one data field set 294, but each dimension d may be in more than one data field set 294.

The data visualization application 222 (or web application 322) queries (112) the data sources 106 for the first data field set 294, and then generates a first data visualization 122 corresponding to the retrieved data. The first data visualization 122 is constructed according to the visual variables 282 in the visual specification 104 that have assigned data fields 284 from the first data field set 294. When there is only one data field set 294, all of the information in the visual specification 104 is used to build the first data visualization 122. When there are two or more data field sets 294, the first data visualization 122 is based on a first visual sub-specification consisting of all information relevant to the first data field set 294. For example, suppose the original visual specification 104 includes a filter that uses a data field f. If the field f is included in the first data field set 294, the filter is part of the first visual sub-specification, and thus used to generate the first data visualization 122.

When there is a second (or subsequent) data field set 294, the data visualization application 222 (or web application 322) queries (114) the data sources 106 for the second (or subsequent) data field set 294, and then generates the second (or subsequent) data visualization 124 corresponding to the retrieved data. This data visualization 124 is constructed according to the visual variables 282 in the visual specification 104 that have assigned data fields 284 from the second (or subsequent) data field set 294.

Figure 2:
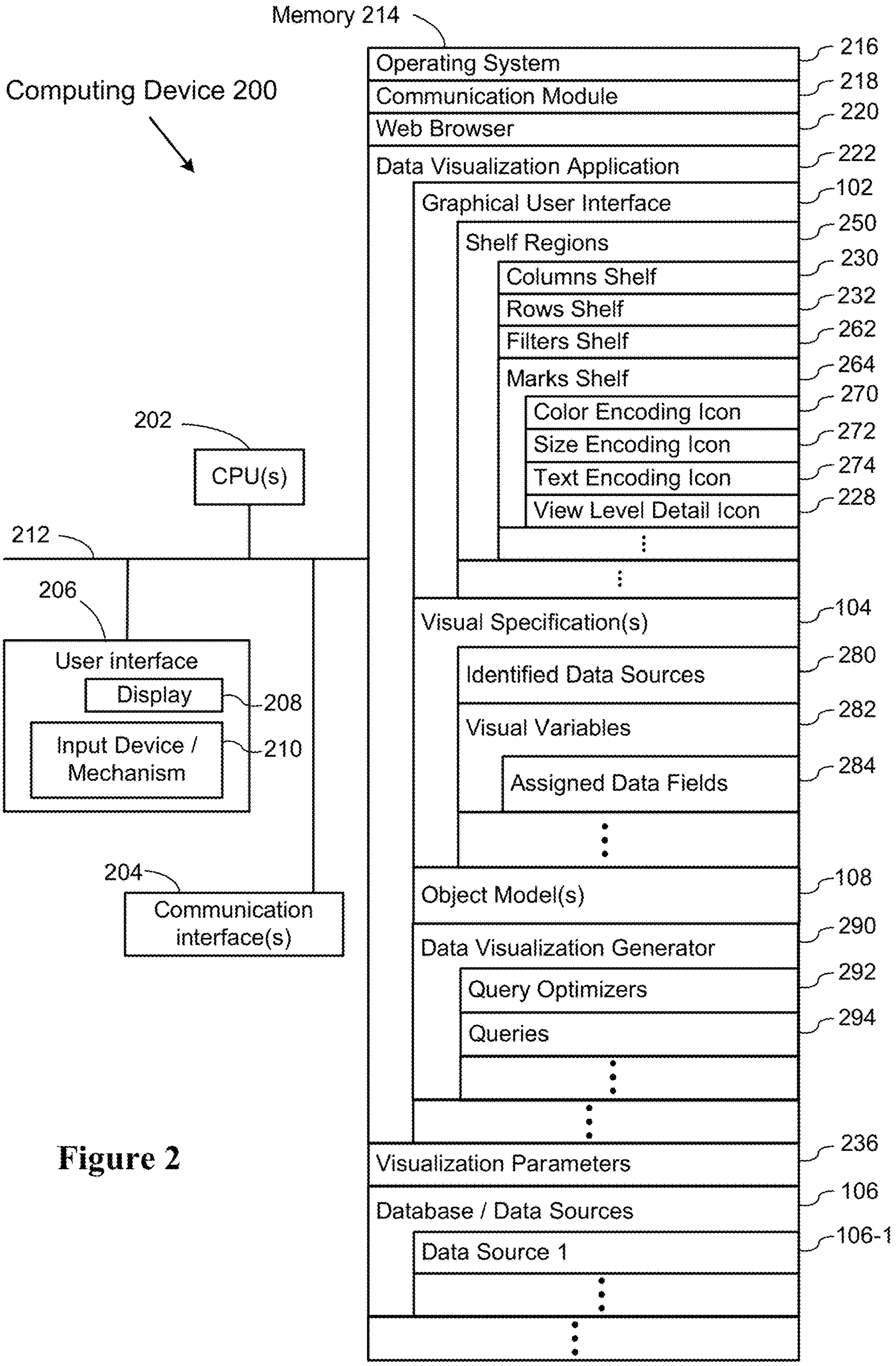
FIG. 2 is a block diagram of a computing device according to some implementations.

FIG. 2 is a block diagram illustrating a computing device 200 that can execute the data visualization application 222 or the data visualization web application 322 to display a data visualization 122. In some implementations, the computing device displays a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for inter-connecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

Figure 4:
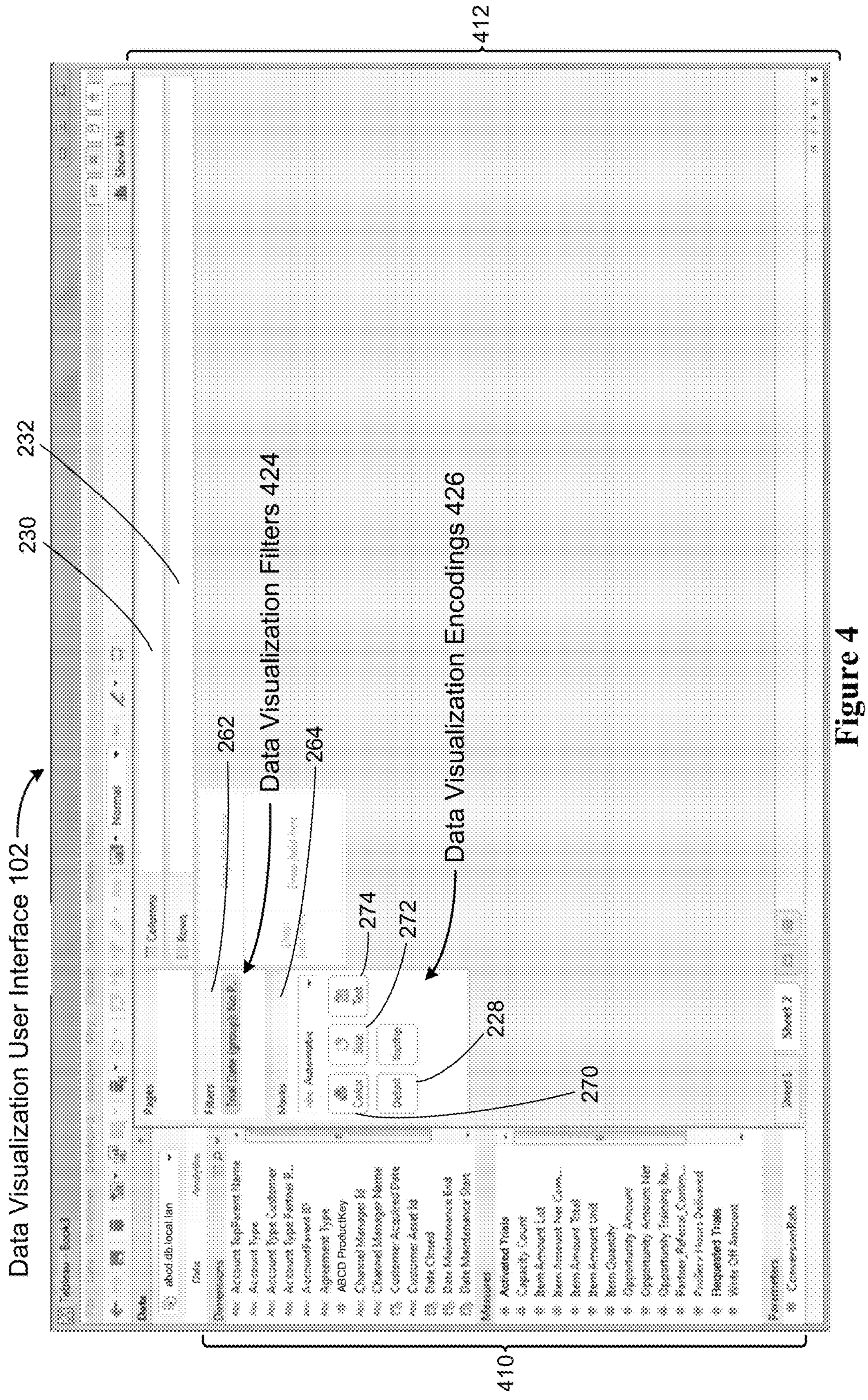
FIG. 4 provides an example data visualization user interface according to some implementations.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);
- a graphical user interface 102, which enables a user to build a data visualization by specifying elements visually, as illustrated in FIG. 4 below;
- in some implementations, the user interface 102 includes a plurality of shelf regions 250, which are used to specify characteristics of a desired data visualization. In some implementations, the shelf regions 250 include a columns shelf 230 and a rows shelf 232, which are used to specify the arrangement of data in the desired data visualization. In general, fields that are placed on the columns shelf 230 are used to define the columns in the data visualization (e.g., the x-coordinates of visual marks). Similarly, the fields placed on the rows shelf 232 define the rows in the data visualization (e.g., the y-coordinates of the visual marks). In some implementations, the shelf regions 250 include a filters shelf 262, which enables a user to limit the data viewed according to a selected data field (e.g., limit the data to rows for which a certain field has a specific value or has values in a specific range). In some implementations, the shelf regions 250 include a marks shelf 264, which is used to specify various encodings of data marks. In some implementations, the marks shelf 264 includes a color encoding icon 270 (to specify colors of data marks based on a data field), a size encoding icon 272 (to specify the size of data marks based on a data field), a text encoding icon (to specify labels associated with data marks), and a view level detail icon 228 (to specify or modify the level of detail for the data visualization);
- visual specifications 104, which are used to define characteristics of a desired data visualization. In some implementations, a visual specification 104 is built using the user interface 102. A visual specification includes identified data sources 280 (i.e., specifies what the data sources are), which provide enough information to find the data sources 106 (e.g., a data source name or network full path name). A visual specification 104 also includes visual variables 282, and the assigned data fields 284 for each of the visual variables. In some implementations, a visual specification has visual variables corresponding to each of the shelf regions 250. In some implementations, the visual variables include other information as well, such as context information about the computing device 200, user preference information, or other data visualization features that are not implemented as shelf regions (e.g., analytic features);
- one or more object models 108, which identify the structure of the data sources 106. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;
- a data visualization generator 290, which generates and displays data visualizations according to visual specifications. In accordance with some implementations, the data visualization generator 290 uses an object model 108 to generate queries (294) and/or optimize queries using query optimizers (292). The details of the query generation and optimization techniques are described below in reference to FIGS. 5A-11, according to some implementations;
- visualization parameters 236, which contain information used by the data visualization application 222 other than the information provided by the visual specifications 104 and the data sources 106; and zero or more databases or data sources 106 (e.g., a first data source 106-1), which are used by the data visualization application 222. In some implementations, the data sources are stored as spreadsheet files, CSV files, XML files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
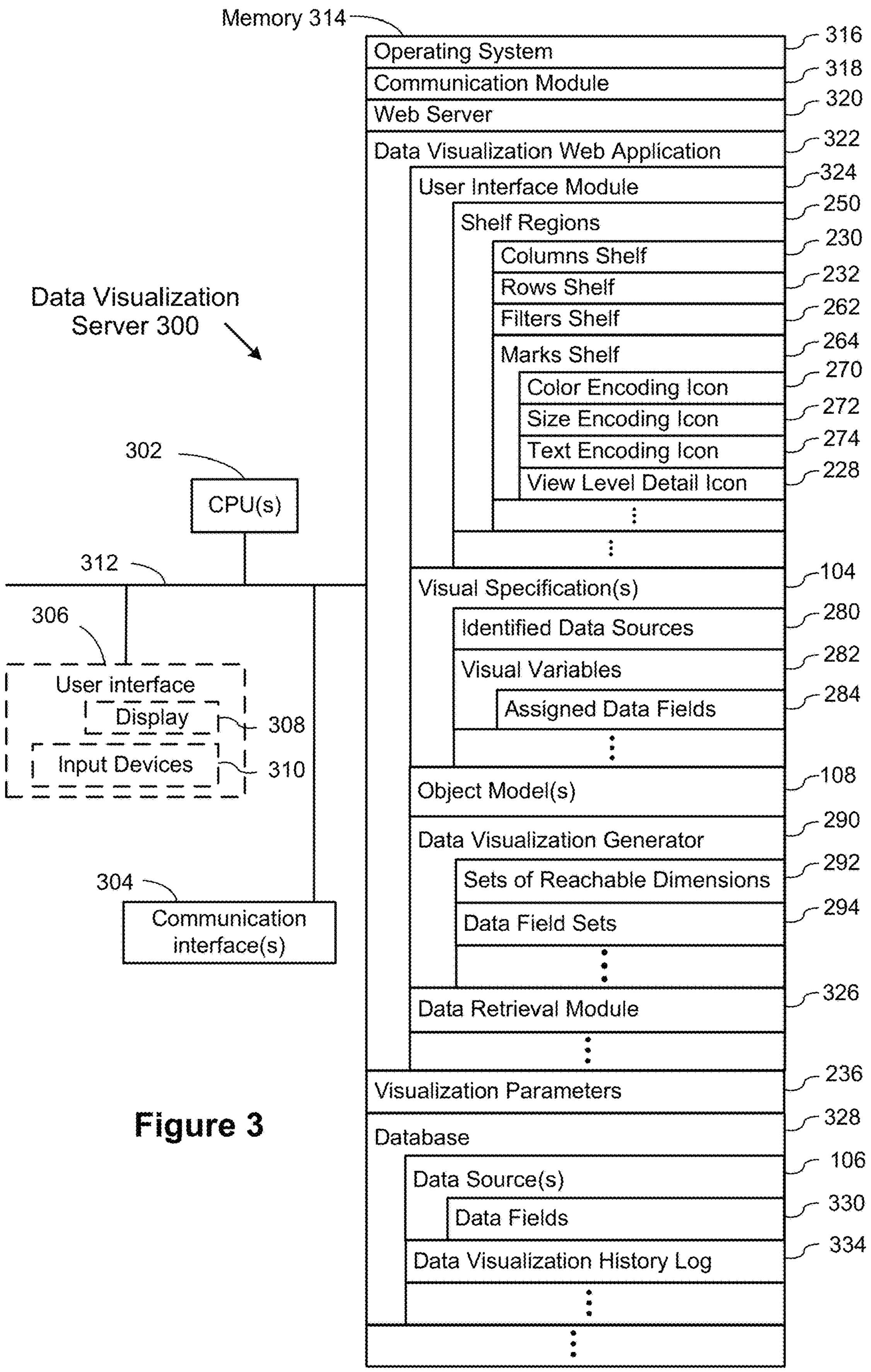
FIG. 3 is a block diagram of a data visualization server according to some implementations.

FIG. 3 is a block diagram of a data visualization server 300 in accordance with some implementations. A data visualization server 300 may host one or more databases 328 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer-readable storage medium.

In some implementations, the memory 314, or the computer-readable storage medium of the memory 314, stores the following programs, modules, and data structures, or a subset thereof:

- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the user interface module 324 specifies shelf regions 250, as described above for a computing device 200;
- the data visualization web application also stores visual specifications 104 as a user selects characteristics of the desired data visualization. Visual specifications 104, and the data they store, are described above for a computing device 200;
- one or more object models 108, as described above for a computing device 200;
- a data visualization generator 290, which generates and displays data visualizations according to user-selected data sources and data fields, as well as one or more object models that describe the data sources 106. The operation of the data visualization generator is described above with respect to a computing device 200;
- in some implementations, the web application 322 includes a data retrieval module 326, which builds and executes queries to retrieve data from one or more data sources 106. The data sources 106 may be stored locally on the server 300 or stored in an external database. In some implementations, data from two or more data sources may be blended. In some implementations, the data retrieval module 326 uses a visual specification 104 to build the queries, as described above for the computing device 200 in FIG. 2;
- in some implementations, the memory 314 stores visualization parameters 236, as described above for a computing device 200;
- one or more databases 328, which store data used or created by the data visualization web application 322 or data visualization application 222. The databases 328 may store data sources 106, which provide the data used in the generated data visualizations. Each data source 106 includes one or more data fields 330. In some implementations, the database 328 stores user preferences.
- In some implementations, the database 328 includes a data visualization history log 334. In some implementations, the history log 334 tracks each time the data visualization web application 322 renders a data visualization.

The databases 328 may store data in many different formats, and commonly include many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 106. In some implementations, the database 328 stores a set of user preferences for each user. The user preferences may be used when the data visualization web application 322 (or application 222) makes recommendations about how to view a set of data fields 330. In some implementations, the database 328 stores a data visualization history log 334, which stores information about each data visualization generated. In some implementations, the database 328 stores other information, including other information used by the data visualization application 222 or data visualization web application 322. The databases 328 may be separate from the data visualization server 300, or may be included with the data visualization server (or both).

In some implementations, the data visualization history log 334 stores the visual specifications 104 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

FIG. 4 shows a data visualization user interface 102 in accordance with some implementations. The user interface 102 includes a schema information region 410, which is also referred to as a data pane. The schema information region 410 provides named data elements (e.g., field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 412. The data visualization region 412 includes a plurality of shelf regions 250, such as a columns shelf region 230 and a rows shelf region 232. These are also referred to as the column shelf 230 and the row shelf 232. In addition, this user interface 102 includes a filters shelf 262, which may include one or more filters 424.

As illustrated here, the data visualization region 412 also has a large space for displaying a visual graphic. Because no data elements have been selected yet in this illustration, the space initially has no visual graphic.

A user selects one or more data sources 106 (which may be stored on the computing device 200 or stored remotely), selects data fields from the data source(s), and uses the selected fields to define a visual graphic. The data visualization application 222 (or web application 322) displays the generated graphic 122 in the data visualization region 412. In some implementations, the information the user provides is stored as a visual specification 104.

In some implementations, the data visualization region 412 includes a marks shelf 264. The marks shelf 264 allows a user to specify various encodings 426 of data marks. In some implementations, the marks shelf includes a color encoding icon 270, a size encoding icon 272, a text encoding icon 274, and/or a view level detail icon 228, which can be used to specify or modify the level of detail for the data visualization.

In some implementations, data visualization platforms enable users to build visualizations through drag and drop actions using a single logical table. Users construct a logical table through physical modeling which can include pivots, joins and unions. Tables combined through physical modeling represent logical tables themselves. In some data visualization platforms, such as Tableau, a query generation model automatically maps user actions to underlying queries. In some implementations, an analyst creates an object model for a data set.

Figure 5A:
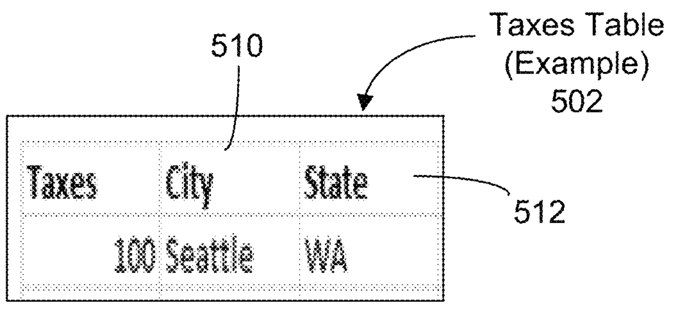
FIGS. 5A-5C illustrate example tables according to some implementations.
Figure 5B:
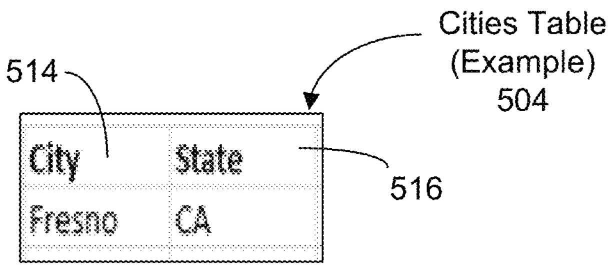
Figure 5C:
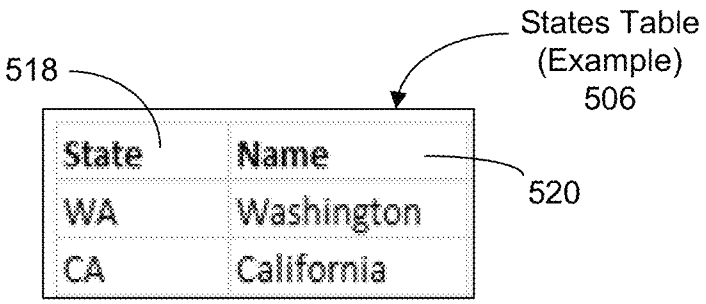

FIGS. 5A-5C illustrate example tables according to some implementations. FIG. 5A is a Taxes table 502 with a [City] field 510 and a [State] field 512. Suppose, as indicated by an object model for the data set, the Taxes table 502 is linked to a Cities object (or a Cities table) 504 (sometimes called a bridge table because it is a bridge between the Taxes table 502 and the States table 506) shown in FIG. 5B. The Cities table has fields [City] 514 and [State] 516. To distinguish these data fields from the data fields in the Taxes table 502 having the same names, sometimes the data fields are identified with a table name includes, such as Cities.city, [Cities].[city], or [Cities (city)]. Suppose further that the Cities table 504 is linked to a States table 506 shown in FIG. 5C. The States table 506 has the fields [State] 518 and [Name] 520. Illustrated in the Taxes table 502 is a single row that is associated with Seattle, Wash. The Cities table 504 does not have a match for Seattle, Wash. (or any Washington city), but the States table 506 does have a row for Washington.

Figure 6A:
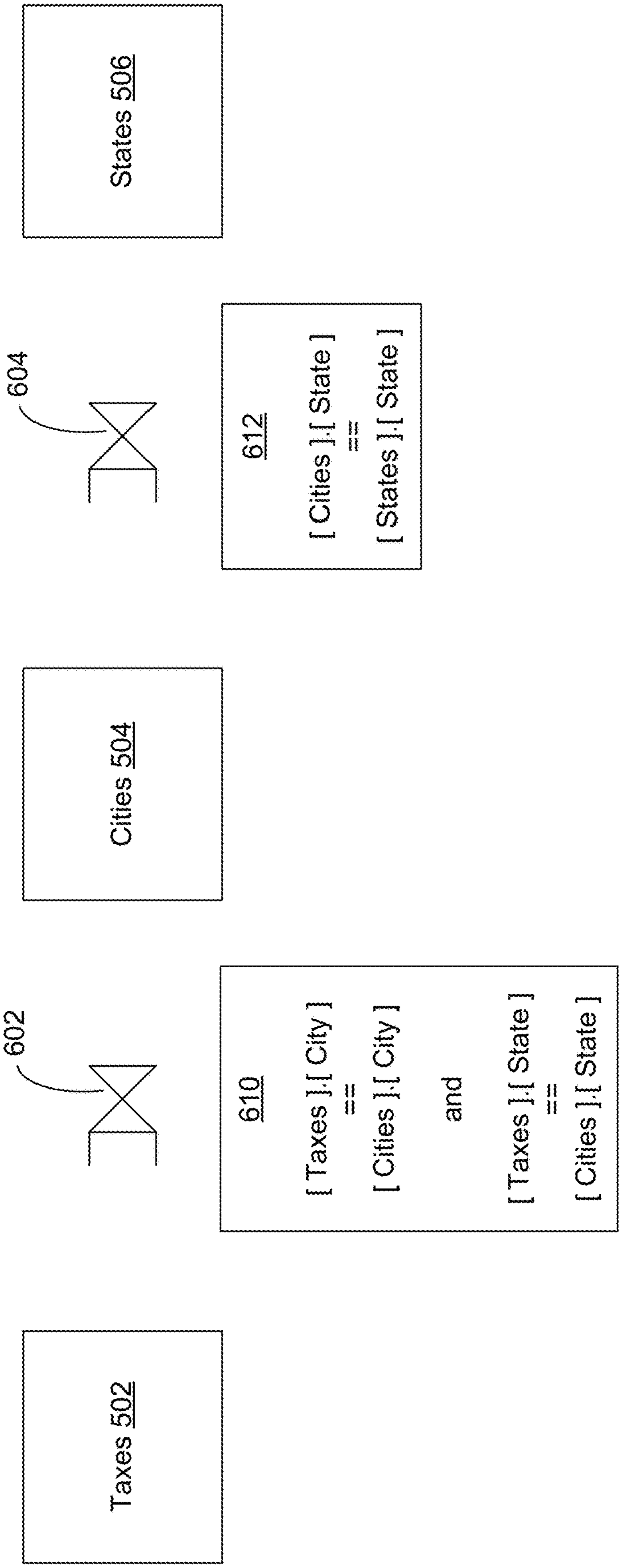
FIG. 6A illustrates an example query, in accordance with some implementations.
Figure 6B:
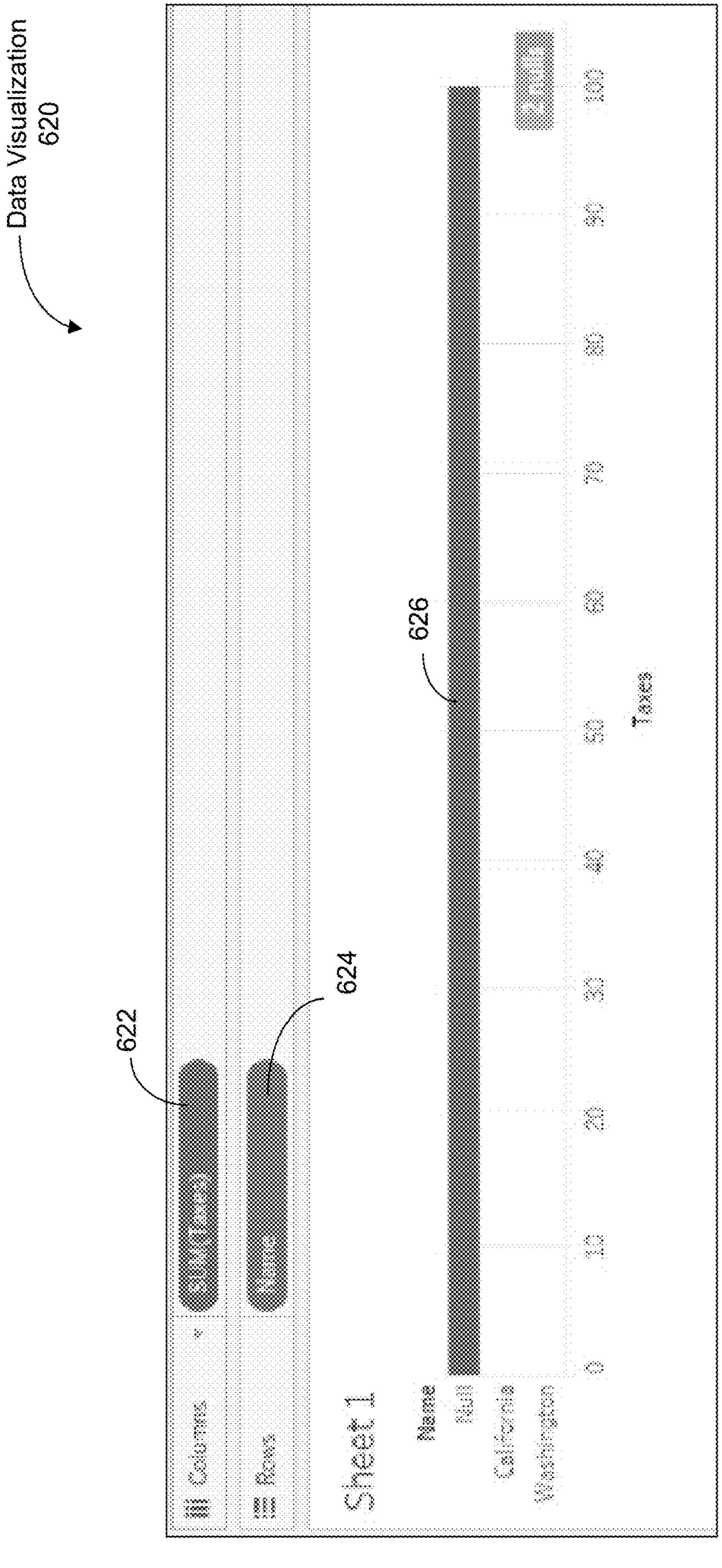
FIG. 6B illustrates a data visualization, in accordance with some implementations.

Referring next to FIG. 6A, suppose a user is analyzing taxes using the tables described above in reference to FIGS. 5A-5C, to retrieve SUM(Taxes) by state name. In response, some visualization platforms generate a query that left-joins the tables on all the keys (between the concerned tables). For this example, the Taxes table 502 is left-joined (602) with the Cities table 504 using the keys 610 (to match [Taxes].[City] with [Cities].[City] and [Taxes].[State] with [Cities].[State]). The results of the first join 602 are left-joined (604) with the States table 506 using the keys 612 (to match [Cities].[State] with [States].[State]). Due to this join semantics, such systems do not match the two States fields from the Taxes table 502 and the States table 506. FIG. 6B illustrates a data visualization 620 corresponding to the user query. In the bar chart shown in the visualization 620, the bar lengths correspond to SUM(Taxes) 622 and the rows correspond to Names (of States) 624. The bar chart shows a bar 626 corresponding to a Null value for the State name, and the bar length is 100, from the single row in the Taxes table 502. Even though there is a row in the States table for Washington, there is no row in the Cities table for Seattle, Wash., so joining the three tables in the way described produces the unexpected data visualization with a Null state name.

Figure 7A:
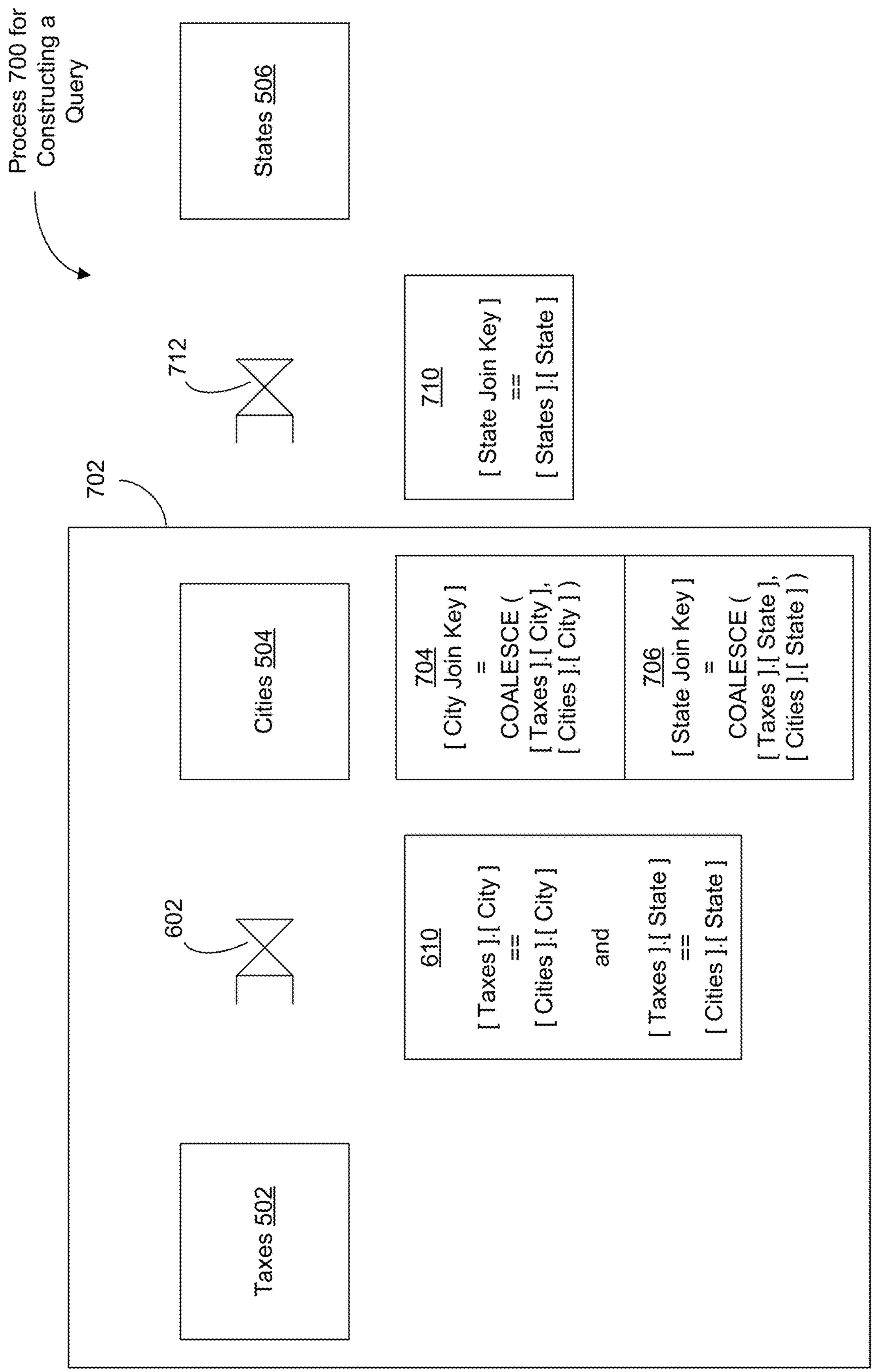
FIG. 7A illustrates a process for constructing a query corresponding to a visual specification (for the examples in FIGS. 5A-5C, 6A, and 6B), according to some implementations.

FIG. 7A illustrates a process 700 for constructing a query corresponding to a visual specification (for the example described above in reference to FIGS. 5A-5C and 6A-6B), according to some implementations. Although the process 700 is more complex than the one illustrated in FIG. 6A, it produces the expected results, as seen in FIG. 7C below. The process includes performing a first left-join 602 between the Taxes table 502 and the Cities table 504. The semantics for the first left-join 602 are unchanged (and, as described above, the join uses the keys 610). Some implementations define one or more hidden join expressions, such as the City Join Key 704 and the State Join Key 706 (sometimes called a coalesce keys, join keys, or coalesce join keys) based on the join keys used in the first join. Some implementations use a COALESCE operation to coalesce (i) a linking data field from the first logical table (e.g., the State field 512 in the Taxes table 502) and (ii) a corresponding linking data field in the second logical table (e.g., the State field 516 in the Cities table 502), according to the object model. Some implementations generate aliased versions of join keys (used in the first left-join) that consists of the two key values coalesced together. Stated differently, this coalesced versions of the key "brings over" the value of the key on the left. In this way, for this example, the system generates a City Join Key (704) and a State Join Key (706), according to some implementations. The coalesces let the City and State values from the Taxes table 502 take part in a second join (712) with the States table 506. The box 702 indicates that the results of the first join (602) and the coalesce operations (704 and 706) are used in the second left-join (712) with the States table 506, according to some implementations. As shown in FIG. 7A, the second left-join operation (712) uses the join key expression calculated in the previous step 702 as part of the key expressions 710, according to some implementations. For this example, the second left-join is based on the key expression [State Join Key] [States].[State] 710.

In some implementations, the join keys are just set to be the values for the data fields in the left table of the left outer join (e.g., State Join Key=Taxes.State). The computed join keys are stored in hidden columns in the intermediate join. In this way, the join keys are available for the system to use, but do not confuse the user by displayed unknown columns.

Figure 7B:
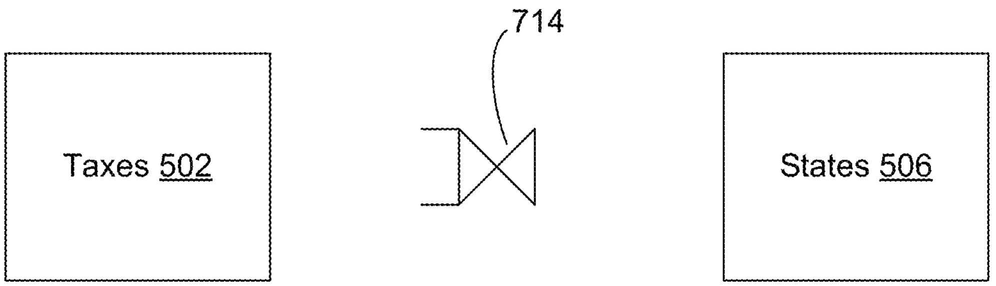
FIG. 7B illustrates a query optimization based on the process described above in FIG. 7A, according to some implementations.
Figure 7C:
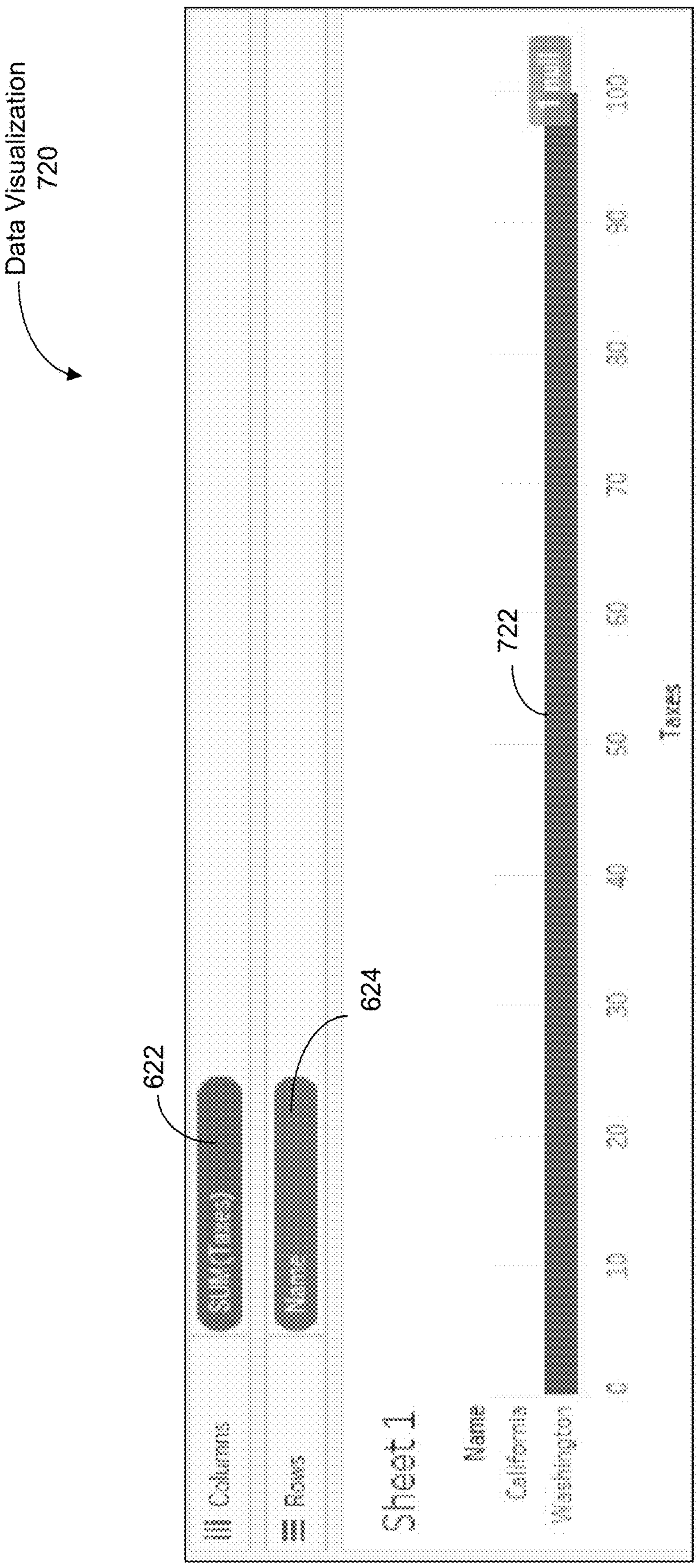
FIG. 7C illustrates a data visualization, in accordance with some implementations.

FIG. 7B illustrates a query optimization based on the process described above in FIG. 7A. Some implementations prune intermediate tables (e.g., the Cities table 504) from the query (generated using the process illustrated in FIG. 7A) and/or intermediate operations, either while generating the query or prior to executing the query. For example, in some implementations, the query (post optimization) would consist of a single left-join (714) that incorporates the hidden join expressions. In some implementations, the coalesce join keys are used in reordering joins. For example, for the model described above in reference to FIGS. 5A-5C, there is a measure from the Taxes table 502 and the "State" dimension from the State table 506. In some implementations, the Taxes table 502 is joined with the Cities table 504 which is in turn joined with the States table 506. Some implementations use the semantics of a coalesce to determine that it is more optimal to join the Taxes table 502 and the States table 5067 directly rather than via the Cities table 504, thus producing a different join order. Some implementations detect that the Cities table 504 does not add anything (for this particular example) and prunes the table from the join altogether.

FIG. 7C shows a data visualization 720 that displays the correct (expected) State name (Washington) for the SUM (Taxes) bar 722 for the example described above, according to some implementations. To generate this data visualization, some implementations recognize (e.g., using the process described above in reference to FIG. 7A) that the two State fields (State field 512 in the Taxes table 502 and the State field 518 in the States table 506) correspond transitively, thereby associating the taxes with Washington state rather than a Null state.

FIGS. 8A-8E illustrate example tables that are part of an object model, according to some implementations. In particular, the examples illustrate a situation where tables are joined on unrelated keys. FIG. 8A is a Budget table 802 with a [Category] field 806, a [Date] field 808, and a [Budget] field 810. Suppose, as indicated by an object model for the data set, the Budget table 802 is linked to an Expenses table 804, an example of which is shown in FIGS. 8B-8E. The Expenses table 804 has fields [Category] 812, [Item] 814, [Cost] 816 and [Date] 818. For this example, suppose (as indicated by the object model) the Budget table 802 (sometimes called the Budget object) and the Expenses table 804 (sometimes called the Expenses object) are joined on Category and Date. Suppose there are some rows in the two tables that match on the Category or Date keys but do not match on both Category and Date. Suppose further that the user requests SUM(Budget) from the Budget table 802 and [Month] from the Expenses table 804 (defined as MONTH (Expenses].[Date]). A query that joins the two tables, without more, can result in unmatched (or null) values for month (depending on whether [Date] or [Expenses (Date)] is used). Suppose additionally that the example requires joining on both Category and Date even though only Date is pertinent.

Figure 9A:
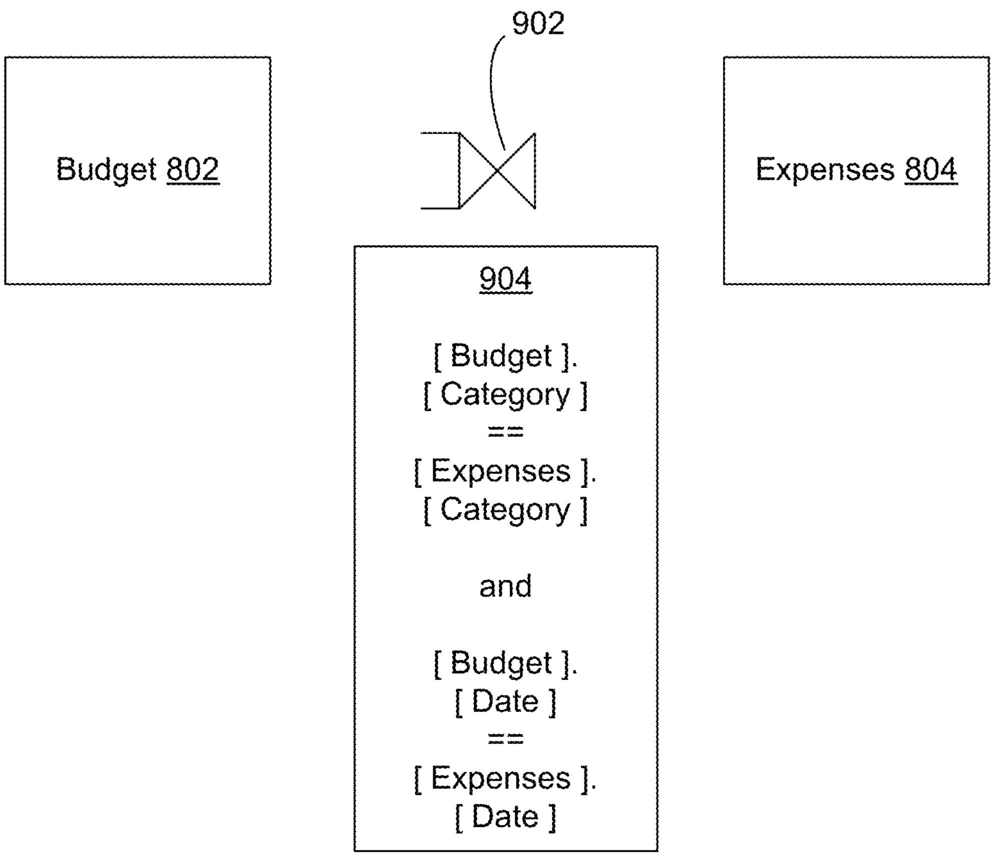
FIG. 9A shows an example query generated by conventional systems.

FIG. 9A shows an example query generated by conventional systems. The query includes a left-join (902) between the Budget table 802 and the Expenses table 804 using the category and date keys 904 ([Budget].[Category]==[Expenses].[Category] and [Budget].[Date]==[Expenses].[Date]). FIG. 9B shows an example data visualization 920 obtained when using Budget (Date) as the Date for joining the two tables. FIG. 9C shows another example data visualization 930 obtained when using Expenses (Date) as the Date for joining the two tables. As both data visualizations illustrate, there are unmatched values for the different measures. The Budget amount is empty in the visualization 920 and the corresponding month for the entry 922 is marked null (i.e., no match)), and the Cost amount is empty in the visualization 930 and the corresponding month for the entry 932 is marked null. Some implementations recognize that, when both the Date and Category fields do not match, there is a matching Date value for every budget/cost in the data set.

To further illustrate problems with conventional systems, FIGS. 9D and 9E illustrate example tables that are part of an object model, according to some implementations. FIG. 9D illustrates a sales table 940, and FIG. 9E illustrates a returns table 950, according to some implementations. Suppose these tables correspond to (or model) a company selling toys. The sales table 940 has an [Amount] field 942, a [Sales Category] field 944 (corresponding to a product category), and [Origin Date] field 946 (an origin date of a sale). The returns table 950 has a [Return Category] field 952 (a product category for a returned product), and an [Origin Date] field 954 (an origin date of a sale or a product being returned). Suppose, as illustrated, some of the return dates are missing (e.g., date for field 956 is missing). The two tables 940 and 950 are related by multiple relationships (category and date fields). Suppose a user requests a data visualization for SUM(Amount), [Return Category]. In other words, the user queries: for any category of toy for which there was a return, how much money in sales was made from that segment (or category)? This particular query does not depend on the date fields 946 or 956.

Suppose the sales table 940 and the returns table 950 are left-joined on both the relationship fields (category and date). The operation results in incorrect results 960 shown in FIG. 9F. The Return category 964 shows a NULL value corresponding to Boats, because Boats is an unknown product (e.g., a product under the category Boats was not returned). But the null category shows a SUM(Amount) value for Cars. In particular, a sum of 10 that is added to the NULL category comes from the Cars category, and the Cars category shows an incorrect SUM(Amount) 962. A reason is that the origin date for the top row 948 in the sales table 940 does not match any of the origin dates 954 in the returns table 950 (maybe because the data 956 is missing). Some conventional systems produce incorrect results like the example shown in FIG. 9F. FIG. 9G illustrates an example of expected results 970. The SUM(Amount) column 972 indicates a value of 30 for the Cars category (one of the return categories 974), and a value of 20 for the NULL category. Some conventional systems construct a subquery to extract the Sales Category (or the column) from the sales table 940 and use that as the dimension. But then the subquery would return a value of 20 corresponding to Boats category, whereas there are no returns for that category. In some instances (e.g., the Budget/Costs example with Month (Date) described above) performing a union of the two domains may produce the right results. But for this specific example in FIGS. 9D and 9F, performing a union of the domains (or extracting the domain of a measure object) does not produce the correct results. When a user asks for SUM([Sales]), [Sales Category], the user wants to know the sum of sales across all the categories for which there was at least one sale. SUM([Sales]), [Returns Category] asks what is the same of sales across all the categories for which there has been at least one return. These questions are different in a subtle way that are not handled by conventional systems.

Figure 10A:
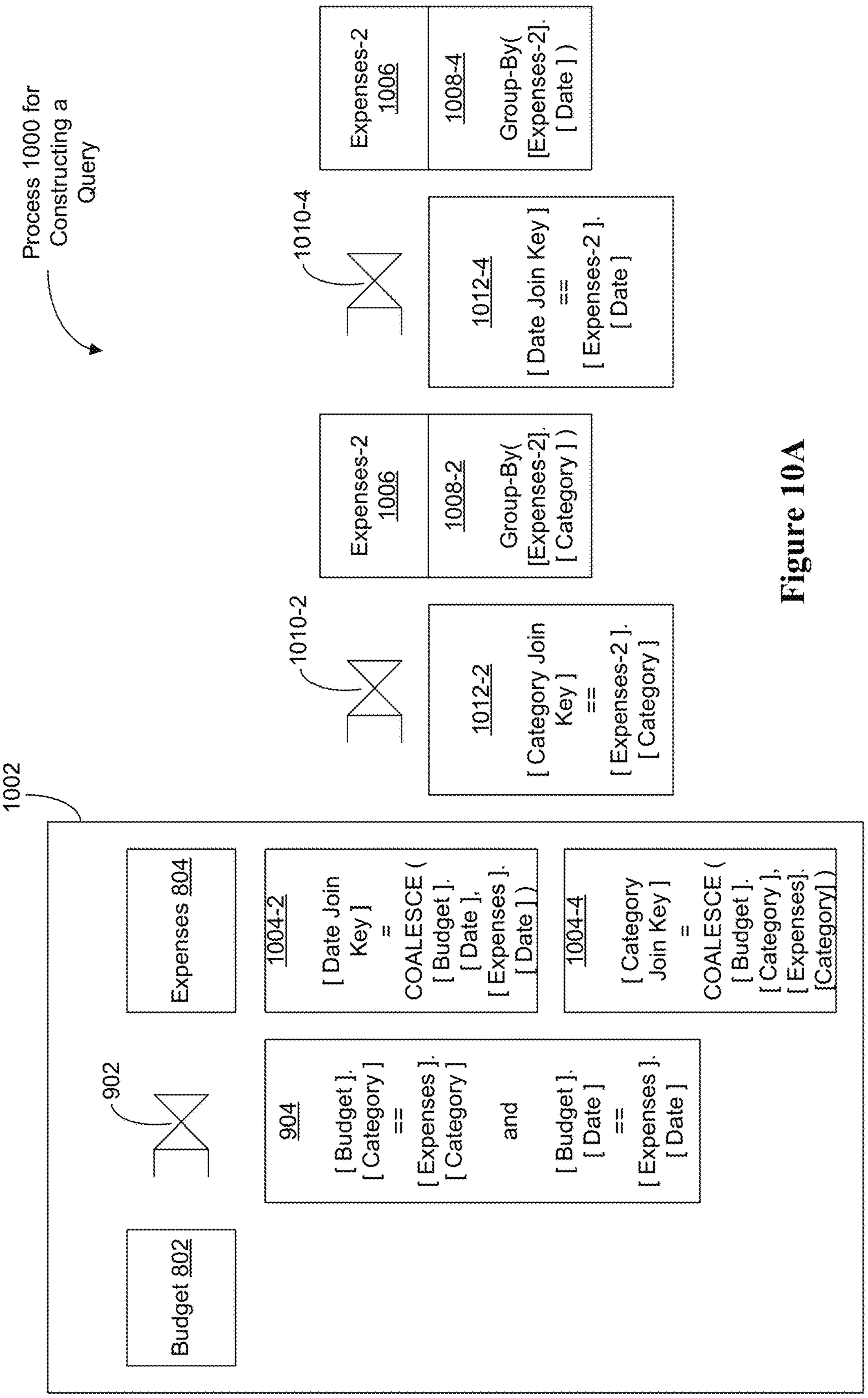
FIG. 10A illustrates a process for constructing a query corresponding to a visual specification (for the examples in FIGS. 8A-8E and 9A-9C), according to some implementations.

FIG. 10A illustrates a process 1000 for constructing a query corresponding to a visual specification, according to some implementations. For the sake of illustration, the process is described in reference to the example described above in reference to FIGS. 8A-8E and 9A-9C, but applies to other situations (e.g., for the situation described above in reference to FIGS. 9D-9G). The process includes performing a first left-join (902) between the Budget table 802 and the Expenses table 804. The semantics for the first left-join (902) are unchanged (and, as described above, the join uses the keys 904). Some implementations define a plurality of hidden join expressions (e.g., the Date Join Key 1004-2 and the Category Join Key 1004-4 based on the join keys used in the first join (902). Some implementations use a COALESCE operation to coalesce (i) a respective linking data field from the first logical table (e.g., the Date field in the Budget table 802) and (ii) a corresponding respective linking data field in the second logical table (e.g., the Date field in the Expenses table 804), according to the object model. This way, for this example, the system generates a Date Join Key 1004-2 and a Category Join key 1004-4, according to some implementations. The coalesces let the Date values from the Budget table 802 and the Category values from the Budgets table 802 take part in joins 1010-2 and 1010-4, respectively, with a copy (or another instance) of the Expenses table 804 (the copy indicated by Expenses-2 1006) grouped by a respective linking data field in the second logical table. In particular, the left-outer join 1010-2 joins the result 1002 of the first left-outer join 902 with the table (or the object) Expenses-2 1006 grouped by (1008-2) the data field category. The result of the left-outer join 1010-2 is subsequently joined, using the left-outer join 1010-4, with the object Expenses-2 1006 grouped by (1008-4) the data field date. The box 1002 indicates the results of the first join (902) and the coalesce operations (1004) are used in the following left-joins 1010-2 and 1010-4 with the Expenses-2 table 1006, according to some implementations.

As shown in FIG. 10A, the left-join operations (1010-2 and 1010-4) use the join key expression(s) (expressions 1004-4 and 1004-2, respectively) calculated in the previous step 1002, according to some implementations. For this example, the left-join 1010-4 is based on [Date Join Key] ==[Expenses-2].[Date] 1012-4, and the left-join 1010-2 is based on [Category Join Key]==[Expenses-2].[Category] 1012-2. It is noted that the particular order of the joins 1010-2 and 1010-4 does not matter. In other words, even if the joins 1010-2 and 1010-4 were interchanged, the final result would still be correct.

The operations described above in reference to FIG. 10A help recover join key values (e.g., calculate correct SUM (Budget) values from the Budget table 802, for all the categories). A key property of the left joins 1010-2 and 1010-4 is that, if the value of the relationship key exists in the Expenses table 804, then the operations 1010-2 and 1010-4 find a match (even without a match on the Category field for the first left-outer join 902). However, if there are no values for this key in the Expenses table, then the process in FIG. 10A returns a null, as expected. The process handles the situation described above in reference to FIGS. 9D-9G. The coalesced version of Category would include Boats. But, by keeping the values of [Return Category] that comes from the subquery, the process shown in FIG. 10A returns a NULL since Boat doesn't exist in that object.

Suppose further that the user requests [Month] from the Expenses table 804 (defined as MONTH(Expenses].[Date]). Some implementations alias the join key to the version of the join key on the right hand side of the join with the single-field subqueries. For the example described above in reference to FIG. 10A, [Date (Expenses)] would refer to the value of Date that comes from the Date subquery joined in. Some implementations layer necessary calculations and/or filters on top of the query generated by the process described above in reference to FIG. 10A. For example, for the user request ([Month] from the Expenses table), some implementations define Month to be MONTH([Date (Expenses)]). Because of the aliasing operation, the layered calculations and/or filters automatically pick up recovered values of the dimensions or linking keys "for free." For example, the Month calculation automatically picks up the correct value for Date from the Expenses table. In other words, calculations and filters do not need to perform any special reasoning about unmatched values.

Some implementations determine a dimension (e.g., Month) from the second logical table (e.g., an instance of the Expense table 804) that is functionally dependent on a join key (e.g., Date) used in the first left-outer join 902, and generate a subquery (e.g., operations 1008) to extract the dimension from the second logical table grouped by the join key used in the first left-outer join. Subsequently, some implementations left-join (1010) the result of the first left-outer join (902) with the result of the subquery using the hidden join key (e.g., using the expression 1012 [Date Join Key]==[Expenses-2].[Date]).

To illustrate further, for the running example, after getting a coalesced version of the Date key, some implementations left-join in dimension objects grouped by Date and join against the coalesced Date key. This step recovers partial matches in relationships. Some implementations subsequently re-compute calculations that are functionally dependent on the recovered join key. For instance, in the running example, the join key is literally Date but the dimension at play is Month(Date).

Figure 10B:
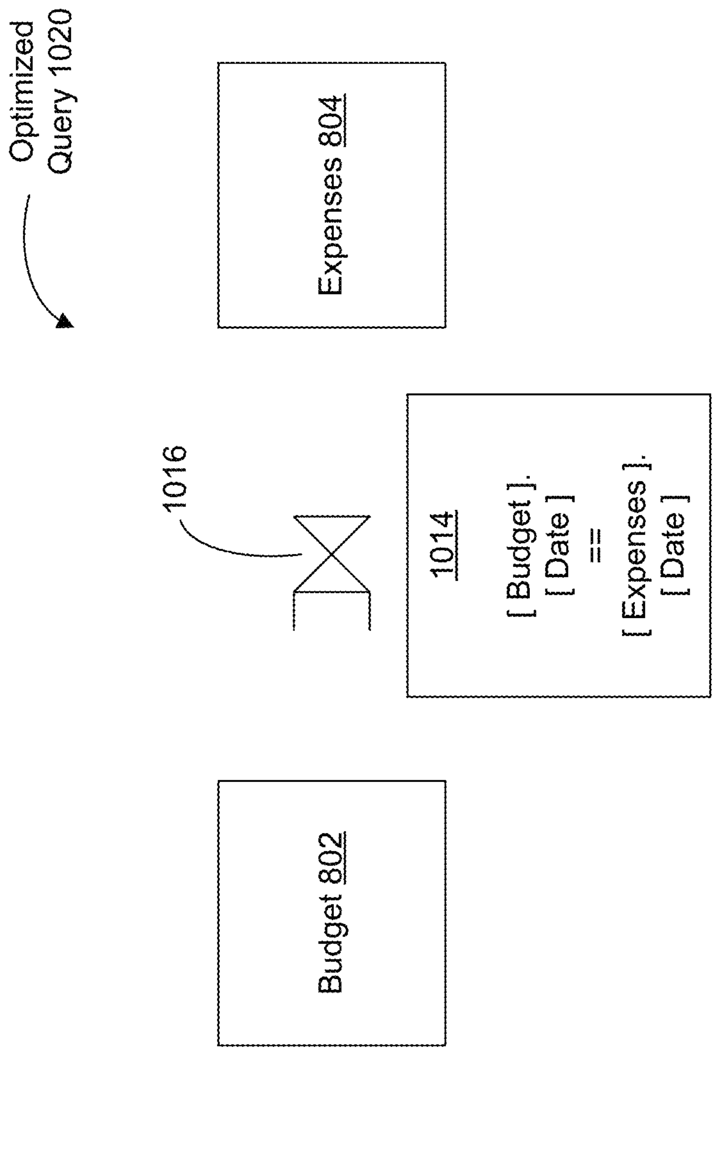
FIG. 10B illustrates a query optimization based on the process described in FIG. 10A, according to some implementations.
Figure 11:
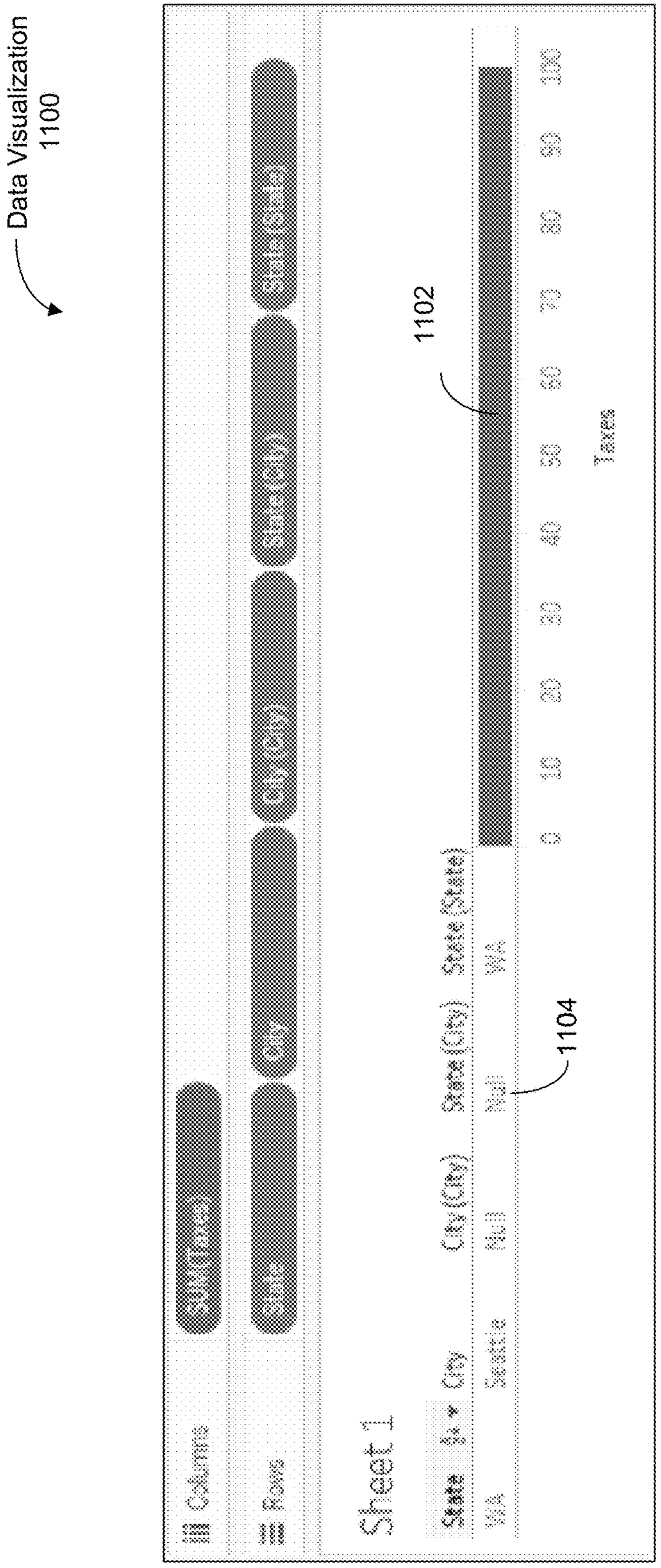
FIG. 11 illustrates a data visualization, in accordance with some implementations.

FIG. 10B illustrates a query optimization based on the process described above in FIG. 10A. Some implementations prune intermediate steps from the query, and join on (1016) only the keys (e.g., the expression 1014 [Budget].[Date]==[Expenses].[Date]) required to compute the dimension.

FIG. 10C shows an example data visualization 1020 obtained when using Budget (Date) as the Date for joining the two tables based on a query constructed using the process described above in FIG. 10A, according to some implementations. FIG. 10D shows another example data visualization 1030 obtained when using Expenses (Date) as the Date for joining the two tables based on a query constructed using the process described above in FIG. 10A, according to some implementations. As both data visualizations illustrate, the system recovers one of the join key values (e.g., Date) and the functionally dependent dimension (e.g., Month).

Some implementations keep the coalesce keys hidden from other data transformations and/or the data visualization. In other words, the hidden join expressions are not exposed outside of the two-step process described above in reference to FIG. 7A and/or FIG. 10A, according to some implementations. For instance, for the example in FIG. 7A, the data visualization indicates that the Cities table 504 does not have a row for Seattle, Wash. This is further illustrated in the data visualization 1100 shown in FIG. 11, according to some implementations. For the example discussed above in reference to FIG. 7A, some implementations obtain a join value of Washington, (and hence the correct SUM(Taxes) amount 1102 for Washington) via the coalesced version of [State (City)] to bring in the corresponding row from the States object. However, as illustrated in the data visualization 1100, there is no match for [State (City)] (e.g., it shows up as null 1104).

FIGS. 12A-12D provide a flowchart of a method 1200 for generating (1202) data visualizations using an object model according to the techniques described above, in accordance with some implementations. The method 1200 is performed (1204) at a computing device 200 having one or more processors and memory. The memory stores (1206) one or more programs configured for execution by the one or more processors.

The computer receives (1208) a visual specification, which specifies one or more data sources 106, a plurality of visual variables 282, and a plurality of data fields 284 from the one or more data sources 106. Each of the visual variables 282 is associated with either (i) a respective one or more of the data fields 284 or (ii) one or more filters. Each of the data fields is identified as either a dimension or a measure. In some implementations, the visual specification 104 includes one or more additional visual variables that are not associated with any data fields 330 from the one or more data sources 106. In some implementations, the visual variables 282 include: rows attribute, columns attribute, filter attribute, color encoding, size encoding, shape encoding, or label encoding.

The computer obtains (1210) an object model encoding the data source as a tree of logical tables. Each logical table has its own physical representation and includes a respective one or more logical fields. Each logical field corresponds to either a data field or a calculation that spans one or more logical tables. Each edge of the tree connects two logical tables that are related. The object model includes a first logical table connected to a second logical table via multiple linking data fields.

The computer constructs (1212) a query corresponding to the visual specification. The query references the first logical table and the second logical table. The computer constructs the query by performing a sequence of operations shown in FIG. 12B. The sequence of operations includes generating (1218) a first left-outer join of the first logical table with the second logical table. The sequence of operations also includes forming (1220) a hidden join key expression comprising coalescing (i) a linking data field from the first logical table and (ii) a corresponding linking data field in the second logical table, according to the object model. In some implementations, the computer forms (1222) a plurality of hidden join key expressions. Each hidden join key expression comprises coalescing (i) a respective linking data field from the first logical table and (ii) a corresponding respective linking data field from the second logical table, according to the object model. The sequence of operations also includes generating (1224) a second left-outer join using the hidden join key expression. Examples of query construction 1212 are explained above in reference to FIGS. 7A and 10A, according to some implementations.

In some implementations, the computer generates (1224) the second left-outer join using (1224) the hidden join key expression to join the second logical table with a third logical table that is connected to the second logical table via multiple linking data fields. In some implementations, the computer uses (1226) the hidden join key expression to join the second logical table with a third logical table that is connected to the second logical table via multiple linking data fields. An example is described above in reference to FIG. 7A, according to some implementations.

In some implementations, the computer generates (1224) the second left-outer join by determining a dimension from the second logical table that is functionally dependent on a join key used in the first left-outer join, generating a subquery to extract the dimension from the second logical table grouped by the join key used in the first left-outer join, and left-joining the result of the first left-outer join with the result of the subquery using the hidden join key expression.

Figure 12A:
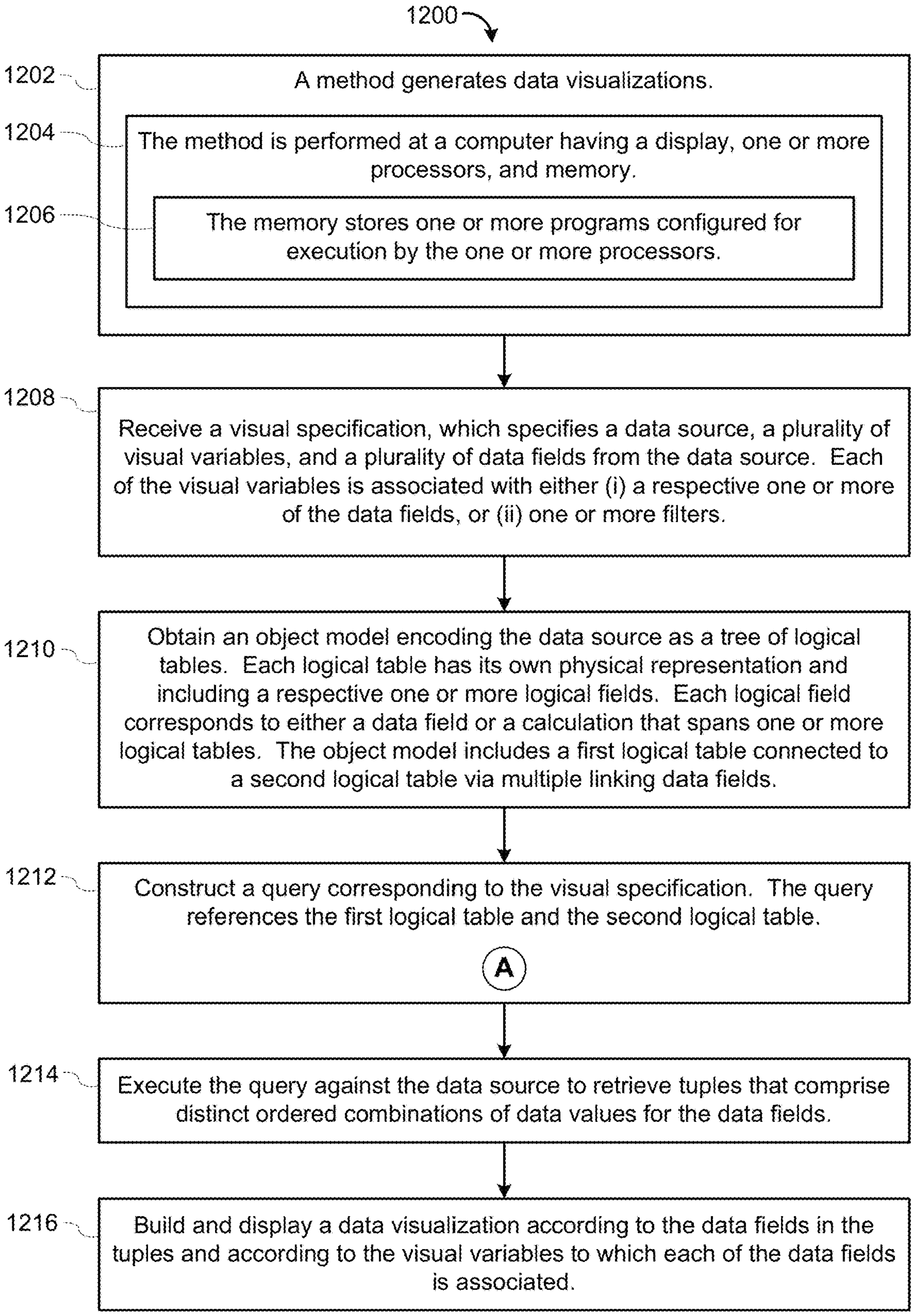
FIGS. 12A-12D provide a flowchart of a method for generating data visualizations using an object model, in accordance with some implementations.
Figure 12B:
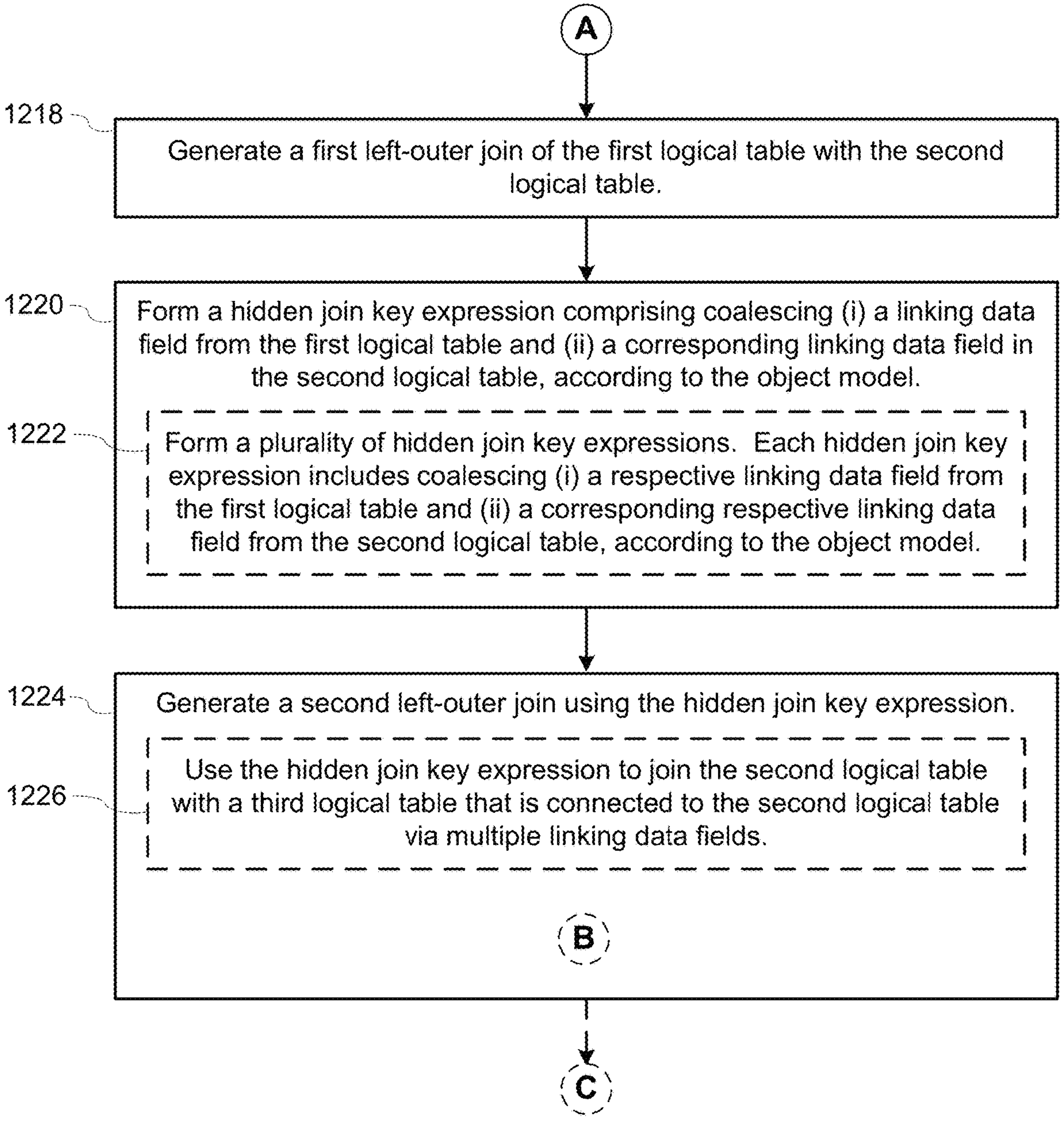
Figure 12C:
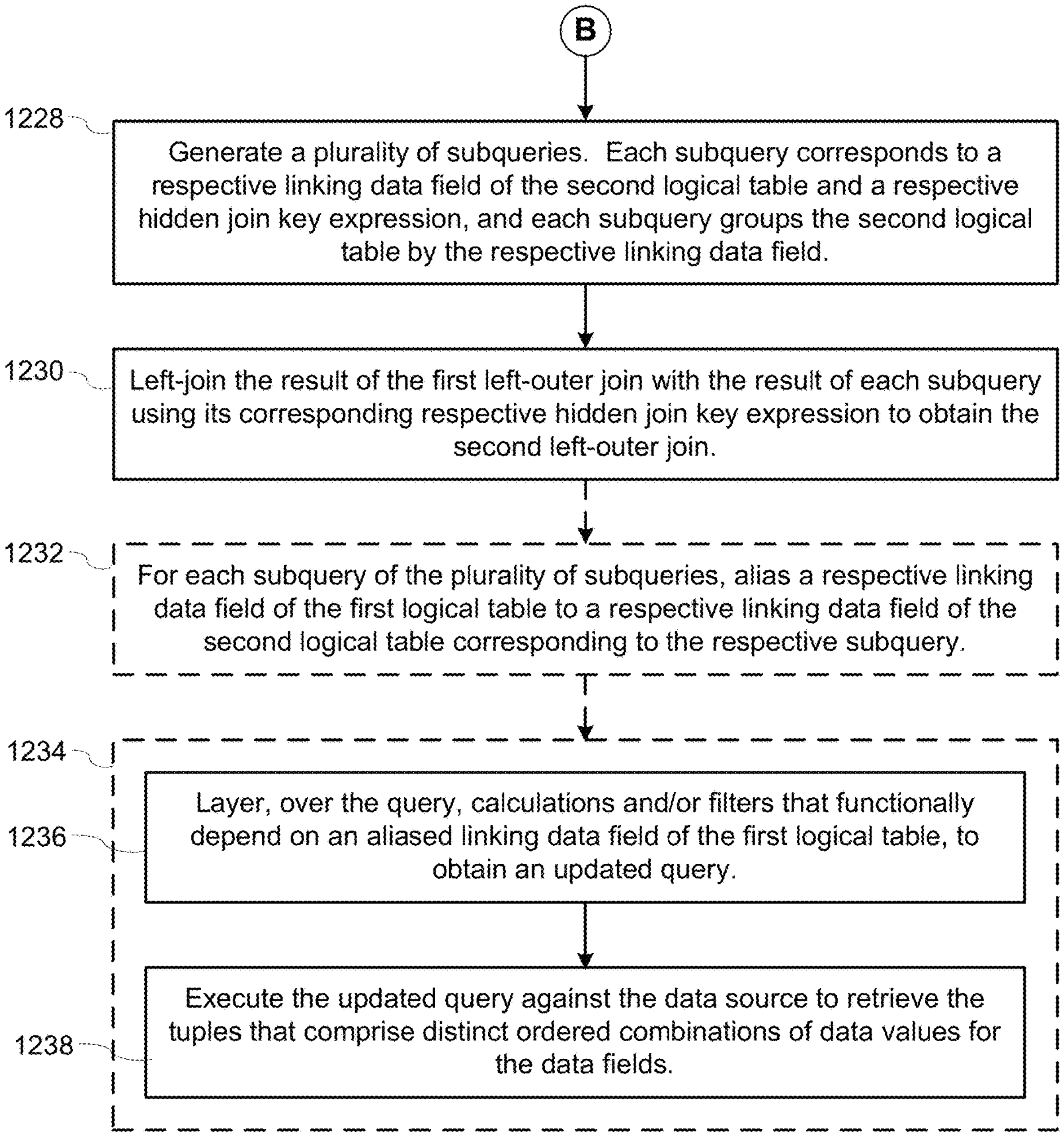

Referring next to FIG. 12C, the computer generates (1224) the second left-outer join by generating (1228) a plurality of subqueries. Each subquery corresponds to a respective linking data field of the second logical table and a respective hidden join key expression, and each subquery groups the second logical table by the respective linking data field. Generating the second left outer join includes left-joining (1230) the result of the first left-outer join with the result of each subquery using its corresponding respective hidden join key expression to obtain the second left-outer join. An example is described above in reference to FIG. 10A, according to some implementations.

In some implementations, the computer, for each subquery of the plurality of subqueries, aliases (1232) a respective linking data field of the first logical table to a respective linking data field of the second logical table corresponding to the respective subquery. In some implementations, the computer performs (1234) calculations on the constructed query (e.g., the MONTH([Date]) calculation), by (i) layering (1236), over the query, calculations and filters that functionally depend on an aliased linking data field of the first logical table, to obtain an updated query, and (ii) executing (1238) the updated query against the data source to retrieve the tuples that comprise distinct ordered combinations of data values for the data fields.

Referring back to FIG. 12A, the computer subsequently executes (1214) the query against the data source to retrieve tuples that comprise distinct ordered combinations of data values for the data fields, then builds and displays (1216) a data visualization according to the data fields in the tuples and according to the visual variables to which each of the data fields is associated.

Figure 12D:
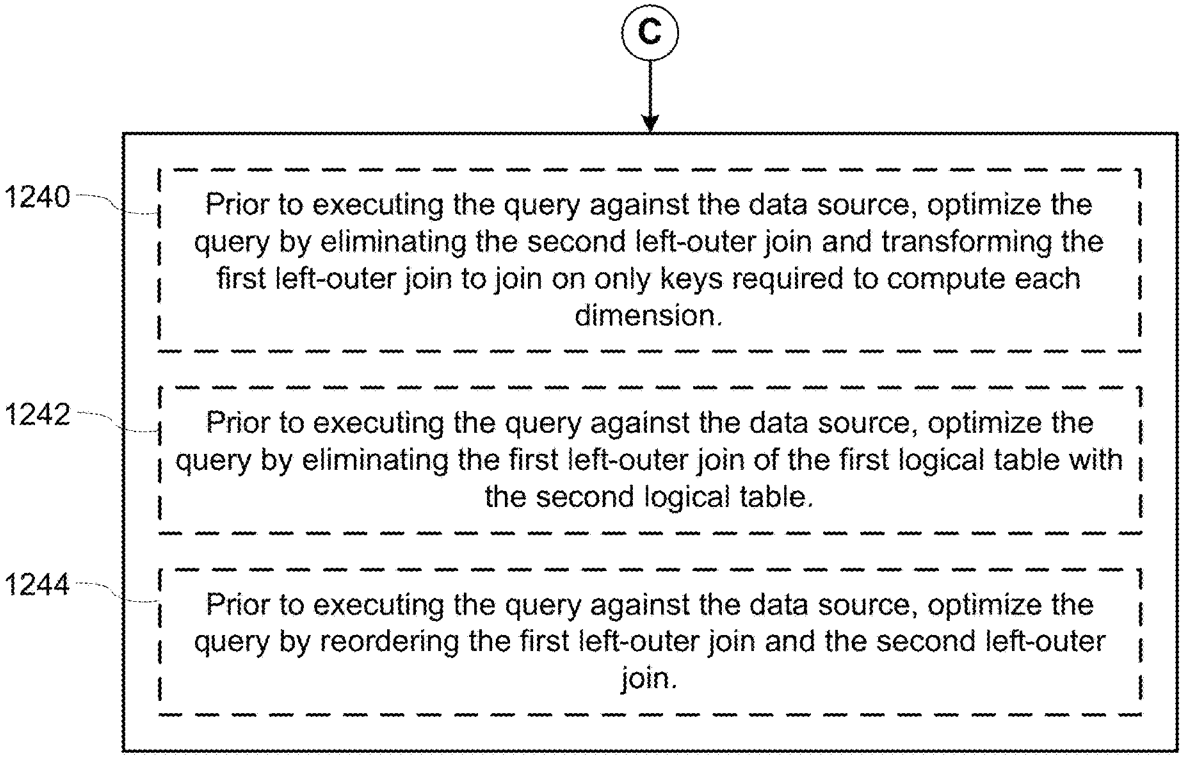

Referring next to FIG. 12D, in some implementations, prior to executing the query against the data source, the computer optimizes (1240) the query (e.g., as described above in reference to FIG. 7B or FIG. 10B) by eliminating the second left-outer join and transforming the first left-outer join to join on only keys required to compute each dimension. In some embodiments, the computer performs the optimization only when the computer determines that the join keys (sometimes called linking data fields) in some later relationship are semantically the same as some keys in an earlier join.

In some implementations, prior to executing the query against the data source, the computer optimizes (1242) the query by eliminating the first left-outer join of the first logical table with the second logical table. In some embodiments, the computer performs the optimization (to eliminate the first left-outer join of the first logical table with the second logical table) only when the computer determines if each pair of logical tables in the data model is connected by a distinct (or unique) set of linking data fields.

In some implementations, prior to executing the query against the data source, the computer optimizes (1244) the query by reordering the first left-outer join and the second left-outer join.

In some implementations, each of the data fields is identified as either a dimension or a measure, and the first logical table and the second logical table are needed to compute a measure. Some implementations generate appropriate aggregation for each measure by inner joining all the objects (tables) needed to compute a measure sub-tree, and left joining the rest of the objects needed for dimensions and filters. In some such implementations, the first logical table and the second logical table belong to the measure sub-tree.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating data visualizations, comprising:

at a computer having one or more processors and memory storing one or more programs configured for execution by the one or more processors:

receiving a visual specification, which specifies a data source, a plurality of visual variables, and a plurality of data fields from the data source, wherein each of the visual variables is associated with either (i) a respective one or more of the data fields or (ii) one or more filters;

obtaining a data model encoding the data source as a tree of logical tables, each logical table having its own physical representation and including a respective one or more logical fields, each logical field corresponding to either a data field or a calculation that spans one or more logical tables, wherein the data model includes a first logical table connected to a second logical table via multiple linking data fields;

constructing a query corresponding to the visual specification, the query referencing the first logical table and the second logical table, including:

generating a first left-outer join of the first logical table with the second logical table;

forming a hidden join key expression comprising coalescing (i) a linking data field from the first logical table and (ii) a corresponding linking data field from the second logical table, according to the data model; and generating a second left-outer join using the hidden join key expression to join the second logical table with a third logical table that is connected to the second logical table via multiple linking data fields;

executing the query against the data source to retrieve tuples that comprise distinct ordered combinations of data values for the data fields; and building and displaying a data visualization according to the data fields in the tuples and according to the visual variables to which each of the data fields is associated.

2. The method of claim 1, further comprising forming a plurality of hidden join key expressions, each hidden join key expression comprising coalescing (i) a respective linking data field from the first logical table and (ii) a corresponding respective linking data field from the second logical table, according to the data model, wherein generating the second left-outer join comprises:

generating a plurality of subqueries, wherein each subquery corresponds to a respective linking data field of the second logical table and a respective hidden join key expression, and each subquery groups the second logical table by the respective linking data field; and left-joining the result of the first left-outer join with the result of each subquery using its corresponding respective hidden join key expression to obtain the second left-outer join.

3. The method of claim 2, further comprising:

for each subquery of the plurality of subqueries, aliasing a respective linking data field of the first logical table to a respective linking data field of the second logical table corresponding to the respective subquery.

4. The method of claim 3, further comprising:

layering, over the query, calculations and filters that functionally depend on an aliased linking data field of the first logical table, to obtain an updated query; and executing the updated query against the data source to retrieve the tuples that comprise distinct ordered combinations of data values for the data fields.

5. The method of claim 2, further comprising, prior to executing the query against the data source, optimizing the query by eliminating the second left-outer join and transforming the first left-outer join to join on only keys required to compute each dimension.

6. The method of claim 1, further comprising, prior to executing the query against the data source, optimizing the query by eliminating the first left-outer join of the first logical table with the second logical table.

7. The method of claim 1, further comprising, prior to executing the query against the data source, optimizing the query by reordering the first left-outer join and the second left-outer join.

8. The method of claim 1, wherein each of the data fields is identified as either a dimension or a measure, and the first logical table and the second logical table are needed to compute a measure.

9. A computer system for generating data visualizations, comprising:

one or more processors; and memory;

wherein the memory stores one or more programs configured for execution by the one or more processors, and the one or more programs comprise instructions for:

receiving a visual specification, which specifies a data source, a plurality of visual variables, and a plurality of data fields from the data source, wherein each of the visual variables is associated with either (i) a respective one or more of the data fields or (ii) one or more filters;

obtaining an data model encoding the data source as a tree of logical tables, each logical table having its own physical representation and including a respective one or more logical fields, each logical field corresponding to either a data field or a calculation that spans one or more logical tables, wherein the data model includes a first logical table connected to a second logical table via multiple linking data fields;

constructing a query corresponding to the visual specification, the query referencing the first logical table and the second logical table, including:

generating a first left-outer join of the first logical table with the second logical table;

forming a hidden join key expression comprising coalescing (i) a linking data field from the first logical table and (ii) a corresponding linking data field in the second logical table, according to the data model; and generating a second left-outer join using the hidden join key expression to join the second logical table with a third logical table that is connected to the second logical table via multiple linking data fields;

executing the query against the data source to retrieve tuples that comprise distinct ordered combinations of data values for the data fields; and building and displaying a data visualization according to the data fields in the tuples and according to the visual variables to which each of the data fields is associated.

10. The computer system of claim 9, wherein the one or more programs further comprise instructions for forming a plurality of hidden join key expressions, each hidden join key expression comprising coalescing (i) a respective linking data field from the first logical table and (ii) a corresponding respective linking data field from the second logical table, according to the data model, wherein generating the second left-outer join comprises:

generating a plurality of subqueries, wherein each subquery corresponds to a respective linking data field of the second logical table and a respective hidden join key expression, and each subquery groups the second logical table by the respective linking data field; and left-joining the result of the first left-outer join with the result of each subquery using its corresponding respective hidden join key expression to obtain the second left-outer join.

11. The computer system of claim 10, wherein the one or more programs further comprise instructions for:

for each subquery of the plurality of subqueries, aliasing a respective linking data field of the first logical table to a respective linking data field of the second logical table corresponding to the respective subquery.

12. The computer system of claim 11, wherein the one or more programs further comprise instructions for:

layering, over the query, calculations and filters that functionally depend on an aliased linking data field of the first logical table, to obtain an updated query; and executing the updated query against the data source to retrieve the tuples that comprise distinct ordered combinations of data values for the data fields.

13. The computer system of claim 10, wherein the one or more programs further comprise instructions for, prior to executing the query against the data source, optimizing the query by eliminating the second left-outer join and transforming the first left-outer join to join on only keys required to compute each dimension.

14. The computer system of claim 9, wherein the one or more programs further comprise instructions for, prior to executing the query against the data source, optimizing the query by eliminating the first left-outer join of the first logical table with the second logical table.

15. The computer system of claim 9, wherein the one or more programs further comprise instructions for, prior to executing the query against the data source, optimizing the query by reordering the first left-outer join and the second left-outer join.

16. The computer system of claim 9, wherein each of the data fields is identified as either a dimension or a measure, and the first logical table and the second logical table are needed to compute a measure.

17. A non-transitory computer readable storage medium storing one or more programs configured for execution by a computer system having a display and one or more processors, the one or more programs comprising instructions for:

receiving a visual specification, which specifies a data source, a plurality of visual variables, and a plurality of data fields from the data source, wherein each of the visual variables is associated with either (i) a respective one or more of the data fields or (ii) one or more filters;

obtaining an data model encoding the data source as a tree of logical tables, each logical table having its own physical representation and including a respective one or more logical fields, each logical field corresponding to either a data field or a calculation that spans one or more logical tables, wherein the data model includes a first logical table connected to a second logical table via multiple linking data fields;

constructing a query corresponding to the visual specification, the query referencing the first logical table and the second logical table, including:

generating a first left-outer join of the first logical table with the second logical table;

forming a hidden join key expression comprising coalescing (i) a linking data field from the first logical table and (ii) a corresponding linking data field in the second logical table, according to the data model; and generating a second left-outer join using the hidden join key expression to join the second logical table with a third logical table that is connected to the second logical table via multiple linking data fields;

executing the query against the data source to retrieve tuples that comprise distinct ordered combinations of data values for the data fields; and building and displaying a data visualization according to the data fields in the tuples and according to the visual variables to which each of the data fields is associated.

* * * * *